United States Patent
Joshi et al.

(10) Patent No.: US 10,482,250 B1
(45) Date of Patent: Nov. 19, 2019

(54) USING A COMMON ACCOUNT TO BLOCK MALWARE ON MULTIPLE DEVICES

(71) Applicant: Symantec Corporation, Mountain View, CA (US)

(72) Inventors: Nikhil Nishikant Joshi, Pune (IN); Sharad Subhash Mhaske, Ahmednagar (IN)

(73) Assignee: Symantec Corporation, Mountain View, CA (US)

( * ) Notice: Subject to any disclaimer, the term of this patent is extended or adjusted under 35 U.S.C. 154(b) by 10 days.

(21) Appl. No.: 15/846,627

(22) Filed: Dec. 19, 2017

(51) Int. Cl.
  *G06F 21/00* (2013.01)
  *G06F 21/56* (2013.01)
  *G06F 21/55* (2013.01)
  *G06F 21/50* (2013.01)

(52) U.S. Cl.
  CPC .......... *G06F 21/568* (2013.01); *G06F 21/50* (2013.01); *G06F 21/55* (2013.01); *G06F 21/56* (2013.01); *G06F 21/562* (2013.01); *G06F 2221/034* (2013.01)

(58) Field of Classification Search
  CPC .......... G06F 21/50; G06F 21/55; G06F 21/56; G06F 21/561; G06F 21/562; G06F 21/566; G06F 21/568
  See application file for complete search history.

(56) References Cited

U.S. PATENT DOCUMENTS

| | | | |
|---|---|---|---|
| 2013/0160126 A1* | 6/2013 | Kapoor | G06F 21/568 726/24 |
| 2013/0305368 A1* | 11/2013 | Ford | G06F 21/568 726/23 |
| 2013/0339937 A1* | 12/2013 | Meggison, Sr. | G06F 8/61 717/168 |
| 2014/0359602 A1* | 12/2014 | Sawaya | G06F 8/61 717/176 |

* cited by examiner

*Primary Examiner* — Edward Zee
(74) *Attorney, Agent, or Firm* — Holland & Hart LLP

(57) ABSTRACT

A method for preventing malware is described. The method may include identifying a malicious application running on a first computing device, determining that the malicious application is installed on a second computing device based on the identifying, and performing a single operation including uninstalling the malicious application from the first computing device and the second computing device.

18 Claims, 11 Drawing Sheets

USING A COMMON ACCOUNT TO BLOCK MALWARE ON MULTIPLE DEVICES

BACKGROUND

The use of computer systems and computer-related technologies continues to increase at a rapid pace. The expansive use of computer systems has influenced the advances made to computer-related technologies. Computer systems have increasingly become an integral part of the business world and the activities of individual consumers. Computer systems may be used to carry out several business, industry, and academic endeavors.

The widespread use of computers and mobile devices has caused an increased presence in malicious behavior including data theft, embedding malware and viruses, and the like. Malware may include software (e.g., processes, executable files, data objects, etc.) that is intended to damage or disable computer systems. Malware programmers are continually adapting to the improvements made in malware detection. Due to the adapted methods and implementations imposed by malware programmers, security methods for malware detection may be beneficial in preventing malware residing on multiple devices and mitigating related issue.

SUMMARY

The described techniques relate to improved methods, systems, or computing devices that support using a common account to block malware on multiple computing devices to protect data and the devices against malicious programs such as ransomware, viruses, a worms, Trojans, rootkits, grayware, spyware, keyloggers, among others. A malware detection application such as an anti-malware software application running on at least one computing device may scan and identify a malicious application residing on the device. Upon identifying the malicious application, the device may determine that the malicious application is installed on another device. Both devices may be associated with a same person or a same organization (e.g., business), as well as be located remote from one another. Benefits of the present disclosure may include eliminating disadvantages of conventional techniques for removing malicious applications from multiple devices, by enabling a mechanism to remove the malicious applications from all the devices in a single operation (e.g., simultaneously, concurrently, synchronously remove the malicious application from all infected devices).

A method for preventing malware at a computing device is described. The method may include identifying a malicious application running on a first computing device, determining that the malicious application is installed on a second computing device based at least in part on the identifying, and performing a single operation comprising uninstalling the malicious application from the first computing device and the second computing device.

A computing device for preventing malware is described. The computing device may include a processor, memory in electronic communication with the processor. The memory may store computer executable instructions that when executed by the one or more processors cause the one or more processors to identify a malicious application running on the computing device, determine that the malicious application is installed on a second computing device based at least in part on the identifying, and performing a single operation comprising uninstalling the malicious application from the computing device and the second computing device.

A non-transitory computer-readable medium for securing and authorizing sensitive operations is described. The non-transitory computer-readable medium may include instructions that when executed by the one or more processors cause the one or more processors to identify a malicious application running on a first computing device, determine that the malicious application is installed on a second computing device based at least in part on the identifying, and performing a single operation comprising uninstalling the malicious application from the first computing device and the second computing device.

Some examples of the method, computing device, and non-transitory computer-readable medium described above may further include processes, features, means, or instructions for enabling the single operation, based at least in part on a setting of the first computing device and the second computing device, to collectively uninstall the identified malicious application from both the first computing device and the second computing device.

Some examples of the method, computing device, and non-transitory computer-readable medium described above may further include processes, features, means, or instructions for generating a message indicating the identified malicious application and a selectable option to perform a security action comprising at least one of quarantining, blocking, or force stopping the identified malicious application, providing the message for display on the first computing device, receiving a response message based at least in part on the message, and performing the security action based at least in part on the response message. In some examples of the method, apparatus, and non-transitory computer-readable medium described above, uninstalling the malicious application from the first computing device is based at least in part on performing the security action.

Some examples of the method, computing device, and non-transitory computer-readable medium described above may further include processes, features, means, or instructions for transmitting, to the second computing device, the message indicating the identified malicious application and the selectable option to perform the security action based at least in part on the first computing device and the second computing device sharing a common account associated with a malware detection application or an enterprise application store. In some examples of the method, apparatus, and non-transitory computer-readable medium described above, uninstalling the malicious application from the second computing device is based at least in part on the message. In some examples of the method, apparatus, and non-transitory computer-readable medium described above, the selectable option to perform the security action comprises a selection to approve or disapprove the uninstall.

Some examples of the method, computing device, and non-transitory computer-readable medium described above may further include processes, features, means, or instructions for performing a malware scan on one or more applications installed on the first computing device. In some examples of the method, apparatus, and non-transitory computer-readable medium described above, identifying the malicious application running on the first computing device is based at least in part on the malware scan.

In some examples of the method, apparatus, and non-transitory computer-readable medium described above, the first computing device and the second computing device share a common account associated with a malware detection application or an application distribution platform. Some examples of the method, computing device, and non-transitory computer-readable medium described above may further include processes, features, means, or instructions for identifying the second computing device based at least in part on the common account. In some examples of the method, apparatus, and non-transitory computer-readable medium described above, determining that the malicious application is installed on the second computing device is based at least in part on the common account. In some examples of the method, apparatus, and non-transitory computer-readable medium described above, the common account comprises an application setting and an association to a database.

In some examples of the method, apparatus, and non-transitory computer-readable medium described above, the application setting comprises instructions to perform at least one of notifying each computing device associated with the common account of the identified malicious application or collectively instructing each computing device associated with the common account to automatically uninstall the identified malicious application, or both. In some examples of the method, apparatus, and non-transitory computer-readable medium described above, the database comprises one or more entries comprising a unique identifier associated with each computing device, an association of each unique identifier to the common account or a trusted third-party account, and a list of applications installed on each computing device, or any combination thereof.

Features from any of the above-mentioned cases may be used in combination with one another in accordance with the general principles described herein. These and other cases, features, and advantages will be more fully understood upon reading the following detailed description in conjunction with the accompanying drawings and claims.

BRIEF DESCRIPTION OF THE DRAWINGS

The accompanying drawings illustrate a number of exemplary cases and are a part of the specification. Together with the following description, these drawings demonstrate and explain various principles of the instant disclosure.

Figure 1:
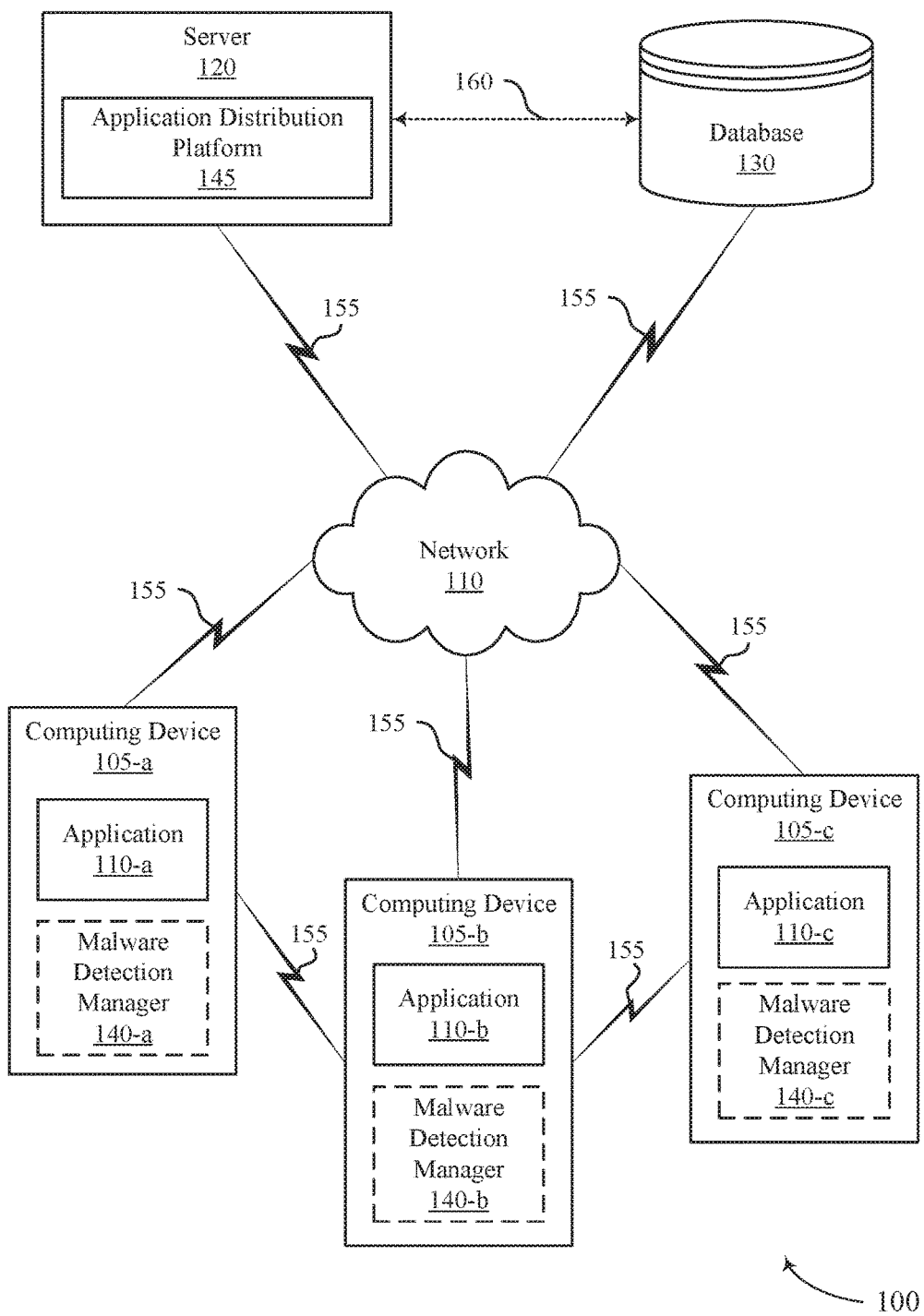
FIG. 1 illustrates a block diagram of an environment that supports using a common account to block malware on multiple computing devices to protect data and the devices against malicious programs, in accordance with aspects of the present disclosure.

While the cases described herein are susceptible to various modifications and alternative forms, specific cases have been shown by way of example in the drawings and will be described in detail herein. However, the exemplary cases described herein are not intended to be limited to the particular forms disclosed. Rather, the instant disclosure covers all modifications, equivalents, and alternatives falling within the scope of the appended claims.

DETAILED DESCRIPTION

The described techniques relate to improved methods, systems, devices, or apparatuses that support malware detection. More specifically, the methods, systems, devices, or apparatuses described herein relate to using a common account to block malware on multiple computing devices. In some cases, two or more computing devices (e.g., a smartphone and a tablet) may share a common account with an application distribution platform or a malware detection application. A computing device may receive a digital distribution from the application distribution platform. A typical application distribution platform may allow persons to discover, browse, share, and download applications from the platform. As such, a digital distribution may be a form of delivering media content such as software applications, without the use of physical media but over online delivery mediums, such as the Internet. In some scenarios, a person may download a same application across multiple computing devices.

The application distribution platform may, in some cases, unintentionally host a number of malicious or illegal applications (e.g., ransomware software). A malicious application may mask as a legitimate application, such as a trustworthy application in an attempt to bait unsuspecting persons to download the malicious application on one or more personal devices. For example, the malicious application may be a ransomware software that may programmed to block access to a computer system. In the case that the downloaded application is malicious and the person installs the application across multiple computing devices, all of the devices become susceptible to malicious action that may compromise sensitive data (e.g., user and privacy data) stored on the devices, impair the functionality of the devices, and perform additional harmful behaviors (e.g., infecting the devices with ransomware, malware, spyware, Trojan horses, viruses, and worms).

A malware detection application running on at least one of the devices may scan and identify the malicious application. Upon identifying the malicious application, a person may manually uninstall the application from the device. However, in the scenario where the application may be installed across multiple devices, uninstalling the application manually from each device may be inefficient. For example, while a person is uninstalling a malicious application from one device (e.g., smartphone), a copy (e.g., a copy of the same malicious application) on another device (e.g., laptop) may continue executing malicious actions thereby reducing the operating characteristics (e.g., central processing unit (CPU) usage, memory usage, power consumption) of the device. In another example, the other device may also be located remote (e.g., home) and the person may be incapable of uninstalling the application until a later time (e.g., hours later). By this point, the malicious application may have already compromised user data and caused damage to the hardware and/or software operational characteristics of the device.

Benefits of the present systems and methods include eliminating disadvantages of conventional techniques for removing malicious applications from multiple devices, by enabling a mechanism to remove the malicious applications from all the devices in a single operation. Thereby improving the operating characteristics (e.g., managing CPU and memory usage levels, reducing latency, decreasing power consumption) of each of the devices and securing sensitive data (e.g., user data and privacy data) by removing detected malware from all infected devices in a single operation.

To enable a single operation (e.g., removal of a malicious application from all related devices), at least one of the devices or all may provide a setting (e.g., via a system setting, or a setting on a malware detection application, etc.) that may enable removal of malicious applications from all connected devices. A connected device may be any device that may be linked (e.g., associated, related) to a common account, a person, a group of persons, or an organization (e.g., profession, private or public business/institute). In some cases, a setting applied at a single device may be propagated (i.e., applied) across all connected devices. For example, a malicious application may be automatically and synchronously processed (e.g., uninstalled, quarantined, blocked, force stopped) from all connected devices, as described herein. In some cases, if a malicious application is detected on any one of the devices, a notification may be displayed on all the devices where the application is installed. In this case, the malicious application may be automatically and synchronously processed (e.g., uninstalled) from all connected devices based on receiving feedback (e.g., approval) from a person at one of the computing devices. As a result, if a person initiates removal of a malicious application on any one of the devices, then the same malicious application may be removed from the remaining devices.

Aspects of the disclosure are initially described in the context of a wireless communications system. Exemplary devices, servers, and process flows that supports using a common account to block malware on multiple computing devices to protect data and the devices against malicious programs, in accordance with aspects of the present disclosure. Aspects of the disclosure are further illustrated by and described with reference to apparatus diagrams, system diagrams, and flowcharts that relate to generating and applying adversarial perturbations to electronic media to protect against malicious programs.

FIG. 1 illustrates a block diagram of an environment 100 that supports using a common account to block malware on multiple computing devices to protect data and the devices against malicious programs, in accordance with aspects of the present disclosure. As depicted, the environment 100 may include a computing device 105-*a*, a computing device 105-*b*, a computing device 105-*c*, a server 120, and a database 130. The techniques described herein may be performed on a device (e.g., the computing device 105 or the server 120, or both). In the illustrated embodiment, the computing device 105-*a*, the computing device 105-*b*, the computing device 105-*c*, the server 120, and the database 130, are communicatively coupled via a network 110 (e.g., via communication links 155).

The computing devices 105 in the environment 100 may be used by way of example. While, the environment 100 illustrates three computing devices 105, the present disclosure applies to any system architecture having one or more computing devices 105. Furthermore, while a single network is coupled to the computing device 105-*a* through 105-*c*, the server 120, and the database 130, the present disclosure applies to any system architecture having any number of networks that may be communicatively coupled to the computing device 105-*a*, the computing device 105-*b*, the computing device 105-*c*, the server 120, and the database 130. Similarly, while the environment 100 illustrates a single server, the present disclosure applies to any system architecture having one or more servers.

In some cases, the computing device 105-*a*, the computing device 105-*b*, the computing device 105-*c*, the server 120, and the database 130 may include a personal electronic device such as a cellular phone, a personal digital assistant (PDA), a tablet computer, a laptop computer, or a personal computer. In some cases, the computing device 105-*a* may include an application 110-*a*, the computing device 105-*b* may include an application 110-*b*, and the computing device 105-*c* may include an application 110-*c*. The applications 110-*a* through 110-*c* may be a same or a different application downloaded, installed, and running on the computing devices 105. In some cases, the computing device 105-*a* through 105-*c* may have one or more additional applications installed. For example, the computing device 105-*a* may optionally include a malware detection manager 140-*a*, the computing device 105-*b* may also optionally include a malware detection manager 140-*b*, and the computing device 105-*c* may also optionally include a malware detection manager 140-*c*. While, the environment 100 illustrates the computing device 105-*a* through 105-*c* each including malware detection manager, the present disclosure applies to any of the computing devices 105 (e.g., at least one) optionally having the malware detection manager.

In some cases, the computing devices 105 and the server 120 may include a malware detection manager where at least a portion of the functions of the malware detection manager are performed separately or concurrently on the computing devices 105 or the server 120, or both. Similarly, in some cases, a person may access the functions of the computing devices 105 (directly or through the computing device 105 via malware detection manager). For example, the computing device 105-*a* may include a mobile-based application that interfaces with one or more functions of the malware detection manager 140-*a* or the server 120.

It is noted that in some cases, the computing devices 105 may not include a malware detection manager. For example, the computing devices 105 may include the applications 110 that allows the computing devices 105 to interface with a malware detection manager that may be located on another computing device or the server 120. Although the components of the computing devices 105 are depicted as being internal to the computing device 105, it is understood that one or more of the components may be external to the computing devices 105 and connect to the computing devices 105 through wired or wireless connections, or both (e.g., via the communication links 155).

The server 120 may be a computing system or an application that may be an intermediary node in the environment 100 between the computing device 105-a through 105-c, or the database 130. The server 120 may include any combination of a social network server, data server, a cloud server, a server associated with an automation service provider, proxy server, mail server, web server, application server, database server, communications server, file server, home server, mobile server, name server, or any combination thereof. In some cases, the server 120 may include an application distribution platform 145.

The server 120 may receive a request from one or more of the computing devices 105 seeking resources from the server 120 and/or the database 130. In some cases, the computing devices 105 may communicate with the server 120 via the network 110. Examples of the network 110 may include any combination of cloud networks, local area networks (LAN), wide area networks (WAN), virtual private networks (VPN), wireless networks (using 802.11, for example), cellular networks (using 3G, LTE, or new radio (NR) systems (e.g., 5G) for example), etc. In some cases, network 110 may include the Internet. In some cases, the server 120 may be coupled to the database 130, via a communication link 160. The communication link 160 may be a wired connection or a wireless connection.

In another example, the server 120 may receive requests from the computing device 105-a, the computing device 105-b, or the computing device 105-c, instructing the server 120 to provide an executable file to install an application (e.g., the application 110-a, the application 110-b, and/or the application 110-c) from the application distribution platform 145 to the computing devices 105. For example, a person may using at least one of the computing devices 105 install one or more software applications from the application distribution platform 145 hosted by the server 120 via the communication links 155. The person may discover, browse, share, and download software applications from the application distribution platform 145. In some examples, applications offered by the application distribution platform 145 may be characterized based on a category, and the person may select a category to discover and download (e.g., install) an application on one or more of the computing devices 105. For example, an application category may include books, business, catalogs, education, entertainment, finance, food and drink, health and fitness, social networking, lifestyle, magazines and newspapers, music, news, shopping, among others. As such, applications 110-a through 110-c may include at least one example of an internet-based service or subscription application (e.g., finance, education, shopping, entertainment), as described above.

The database 130 may in some cases store data that may include configuration files, web page sources, scripts, and any other data that may be used by the computing devices 105 or an application executing and running on the computing devices 105. For example, upon receiving the request to provide an executable file to install an application from the application distribution platform 145 to the computing devices 105, the server 120 may parse and retrieve an executable file associated with the requested application, from the database 130, based on the information provided in the request (e.g., application identifier, operating system type (e.g., Linux, Unix, Mac OS X, Windows, etc.) of the computing devices 105) and provide the executable file to the appropriate computing device(s) 105 via the communication links 155. The computing device(s) 105 may receive the executable file and install the application on each of the respective devices.

The database 130 may be internal or external to the server 120. In one example, one or more of the computing devices 105 may be coupled directly to the database 130, the database 130 being internal or external to the computing devices 105. The database 130 may be a relational database (e.g., a relational database management system (RDBMS) or a Structured Query Language (SQL) database), a non-relational database, a network database, an object-oriented database, among others. The database 130 may include additional stored data such as, device identification information, user accounts, configuration files, executable files for applications, etc. The database 130 may store information associated with any of the computing device 105-a, the computing device 105-b, and the computing device 105-c. For example, stored data may be associated with an application (e.g., a malware detection application) that may include account information including personal data about a person such as: name, address, phone number, registered devices, payment information, subscription information, management settings (e.g., malware scan schedule, automatic malware protection, add new device(s) option, etc.).

In some examples, the database 130 may include a table that may have a set of data elements (e.g., account information, applications installed on each computing device 105 associated with a same account). For example, the table may include a number of columns and a number of rows. Each row may be associated with a computing device 105, and each column may include information (e.g., applications installed, management settings) associated with each computing device 105. In some cases, each computing device 105 may transmit to the server 120 a summary of the application installed after the installation is successful. A list of installed applications may be maintained for each person and computing device 105, in the database 130.

In some cases, the application distribution platform 145 may inadvertently host a malicious application (e.g., from an untrusted source, a ransomware application). For example, a malicious application may mask as a trustworthy application in an attempt to lure unsuspecting persons to download the malicious application on one or more personal devices (e.g., the computing device 105). In the case that the downloaded application is malicious and the person installs the application across multiple computing devices 105, all of the computing devices 105 become vulnerable to malicious action that may compromise sensitive data (e.g., user and privacy data) stored on the computing devices 105, harm the functionality of the computing devices 105, and perform additional harmful behaviors (e.g., infecting the devices with viruses).

A malware detection application (e.g., malware detection manager 140) running on at least one of the computing devices 105 may scan and identify the malicious application (e.g., the application 110). Upon identifying the malicious application, a person may manually initiate a security action (e.g., quarantine, force stop, uninstall, etc.) on the application running on the computing device 105. However, in the scenario where the application may be installed across multiple computing devices (e.g., computing device 105-a, computing device 105-b, and/or computing device 105-c) manually initiating the security action on the application for each computing device 105 may be inefficient. For example, while a person is uninstalling a malicious application from the computing device 105-a, the same installed malicious application on the computing device 105-b may continue executing malicious actions thereby reducing the operating characteristics (e.g., CPU usage) of the computing device 105-b. Benefits of the present disclosure include handling malicious applications across multiple computing devices 105, by enabling a mechanism to handle (e.g., quarantine, uninstall, block, etc.) the malicious applications from all the computing devices in a single operation. Thereby improving the operating characteristics of each of the computing devices 105.

A person or an administrator of an organization associated with the computing devices 105 may install a malware detection application. For example, a person may install on each computing device 105-a, computing device 105-b, and computing device 105-c a malware detection application (e.g., malware detection manager 140-a through 140-c). During the installation of the malware detection application, the person may create and register an account with a service or a subscription associated with the malware detection application. The person may add or remove computing devices from the account. In some examples, the person may be restricted to a number of computing devices that may be associated with the account (e.g., due to a threshold number of licenses issued for the account). Account information associated with the account may be stored locally on any of the computing devices 105 or remotely in the database 130.

The malware detection application may record, store, track, and monitor the number of computing devices 105 associated with the account. For example, the malware detection application may request, during installation, from each of the computing devices 105 to provide identification information (e.g., medium access control (MAC) address, terminal identification number (TID or TIN), a unique device identification (UDI), among others). The malware detection application may store the identification information in the database 130, as described herein. In some examples, the malware detection application may be hosted by the server 120, and each of the computing devices 105 may upload the identification information during install to the server 120.

The malware detection application may also track one or more applications (e.g., social network, education) installed on each computing device 105. In some examples, the malware detection application may receive information associated with the one or more installed applications from the application distribution platform 145. For example, the person may have an account associated with the application distribution platform 145. The application distribution platform 145 may provide the information to the malware detection application (e.g., malware detection manager 140) via the server 120. As such, the computing device 105-a, the computing device 105-b, and the computing device 105-c may be connected to a common account associated with the malware detection application and/or the application distribution platform 145.

In some cases, the computing device 105-a may launch the malware detection application (e.g., malware detection manager 140-a) and perform a malware scan on one or more applications installed on the computing device 105-a. The malware scan may be a background process running on the computing device 105-a. Alternatively, the computing device 105-b and/or the computing device 105-c may also perform a malware scan on one or more applications installed on these devices. In some examples, the malware scan may be automatically or manually initiated. For example, a person may select a setting on the malware detection application for one or more of the computing devices 105 to automatically perform the malware scan during a scheduled period (e.g., run at a specific time interval every 7 days, or daily, weekly or monthly). In some examples, automatically performing the malware scan may be based on one or more additional parameters. For example, one or more of the computing devices 105 may perform the scan during an idle time (i.e., when the computing device 105 is not in use) or when the computing device 105 is connected to AC power.

Additionally or alternatively to a scheduled scan, the computing devices 105 may perform a batch scan. For example, the computing devices 105 may cache an application and any related files as it is being installed or received from a source (e.g., the server 120), and the computing devices 105 may examine the application and related files for malware and/or viruses. Based on results of the batch scan, e.g., whether the application is detected to be malicious and/or that one or more files, scripts, etc. include malware, the computing devices 105 may perform a security action, as discussed further in detail below.

In some cases, the malware detection application may be installed (e.g., preinstalled) on the computing device 105. The malware scan may scan for malware using the database 130 that may include a number of known malware definitions (also called signatures). These definitions may indicate known malware. If the malware detection application detects an application (e.g., executable file, package, etc.) that matches the definition, it'll flag it as potential malware. Alternatively, the malware detection application may perform a heuristics analysis. That is, an alternative to database scanning, heuristic analysis may allow the malware detection application to detect threats that were not previously identified. Heuristic analysis may identify malware by behaviors and characteristics, instead of comparing against a list of known malware.

In some cases, alternatively, the computing device 105 may, via the malware detection application, run (e.g., execute, process) one or more applications suspected to be malicious in a sandbox, which may be a protected space on the computing device 105. For example, a malicious application may believe it has full access to the computing device 105 when, in fact, it is running in an enclosed space while the malware detection application monitors its behavior. If it demonstrates malicious behavior, the malware detection application may flag it or perform another operation (e.g., terminate the malicious application). Otherwise, the application may be allowed to execute outside the sandbox.

With reference to the malware scan, in some cases the scan may result in an identification of a malicious application (e.g., the application 110-a) running on the computing device 105-a. Upon identifying the malicious application, the computing device 105-a may determine that the malicious application identified is also installed on the computing device 105-b or the computing device 105-c, or both. The computing device 105-a may determine the malicious application identified is also installed on the computing device 105-b or the computing device 105-c, or both based on these device sharing a common account associated with the malware detection application and/or the application distribution platform 145. For example, the malware detection application may retrieve account information (including a list of devices linked to a same account associated with the malware detection application) from the database 130, and identify that the computing device 105-b or the computing device 105-c are linked to the account.

Alternatively, upon identifying the malicious application running on the computing device 105-a, the malware detection application (e.g., the malware detection manager 140-a)

running on the computing device 105-a may transmit a message to a third-party server associated with the malware detection application. The third-party server may identify additional computing devices (e.g., the computing device 105-b and/or the computing device 105-c) linked to the same account as the computing device 105-a and determine that these devices also have the malicious application installed. For example, the third-party server may receive account information from the application distribution platform 145 via server 120. This account information may include a list of applications installed on the computing device 105-a. The list may also include information indicating additional computing devices associated with the account that may have the same application installed on it (e.g., the computing device 105-b and/or the computing device 105-c).

In some examples, the computing device 105-a may refrain from performing additional analysis on the detected malicious application (i.e., whether the application is installed on other device (e.g., the computing device 105-b and/or the computing device 105-c). In this example, the computing device 105-a may generate a notification message and alert the computing devices 105-b and/or 105-c of the detected malicious application. For example, the computing device 105-a may transmit a notification message to the computing device 105-b and/or the computing device 105-c. Upon receiving the notification message, each computing device 105 may identify the detected malicious application based on the notification message. For example, the notification message may include information identifying the detected malicious application (e.g., application identifier). Each computing device 105 may determine whether the identified malicious application is installed on the device. Based on the results of this determination, the computing device 105 may continue to operate under normal conditions (e.g., processes) or may initiate a security action, as discussed further in detail below. Therefore, by allocating the analysis (i.e., determination of whether the detected malicious application is installed on other devices) to other associated devices (e.g., the computing device 105-b and/or the computing device 105-c), the computing device 105-a may have improved processing capabilities and reduced power consumption.

In some cases, the computing devices 105 may via the malware detection application flag the identified malicious application. For example, the identified malicious application may be flagged via an entry in the database 130 that may indicate that the application (e.g., the application 110-a) is malicious. As such, during a subsequent time, if the person decides to install the application on a different device (i.e., a device that did not previously have the application installed), the malware detection application may notify the person that the requested application is identified as a malicious application.

In some cases, the computing device 105-a may perform a single operation including uninstalling the malicious application from the computing device 105-a and any other associated device (e.g., the computing device 105-b or the computing device 105-c, or both). Additionally or alternatively, the single operation may include quarantining the malicious application from the computing device 105-a and any other associated device, before performing an uninstall of the application. For example, quarantining the malicious application from the computing device 105-a may include isolating the malicious application (and any related infected files) from the computing device 105-a. Isolating the malicious application and any related infected file(s) may eliminate the malicious application from performing additional harm to hardware of the computing device 105-a and/or compromising any further sensitive data from the computing device 105-a.

In some cases, the computing devices 105 may have a system setting to enable and/or disable quarantining an application based on detection of the application as a malicious application on another device. That is the computing device 105-b may enable an option to quarantine an or any application that may be detected as a malicious application on the computing device 105-a and/or the computing device 105-c. For example, the computing device 105-a and the computing device 105-b may have a same application installed. The computing device 105-a may detect that the application is a malicious application and notify the computing device 105-b. The computing device 105-b may have an enabled option to quarantine the application based on the notification that the application is malicious. As a result, upon receiving a notification from the computing device 105-a, the computing device 105-b may quarantine the application (if the application is also installed on the device 105-b).

In some cases, the computing device 105-a may block an installation of the application if malware and/or viruses are detected during a scan (e.g., a batch scan). In this case, performing the single operation may include blocking the installation of the application. Thereby, mitigating malware from being installed on the computing device 105-a. Alternatively, the single operation may include an option to select that even though the application is detected to be malicious, the application can be marked as trusted. In this case, the computing devices 105 may refrain from removing the application. The computing devices 105 may also store the indication that the detected malicious application has been marked as trusted, in the database 130. In some cases, the computing device 105 may apply and perform machine learning techniques (e.g., support vector machines, decision trees, Naïve Bayes classification, ordinary least squares regression, logistic regression) to automatically and autonomously perform a single operation (i.e., security action).

In some cases, the computing device 105-a may enable the single operation, based at least in part on a setting of the computing device 105-a, the computing device 105-b, and/or the computing device 105-c, to collectively quarantine and/or uninstall the identified malicious application from all the computing devices 150 simultaneously. For example, the malware detection application (e.g., the malware detection manager 140) may provide the setting via a user interface of the malware detection application.

The setting may include an auto-protect option that may enable the computing devices 105 to autonomously of user interaction, remove (e.g., uninstall, quarantine, etc.) the identified malicious application from all infected devices. The auto-protect option may be based on machine learning techniques. In some examples, the auto-protect option may apply to an identified malicious application that may have a certain risk level associated with it. For example, the malware detection application may perform an analysis on the behavior of the identified malicious application and assign a risk level based on the behavior. If the risk level meets a threshold value, the malware detection application may automatically remove (e.g., quarantine, uninstall) the application from all infected computing devices 105 in a single operation. Alternatively, if the risk level does not meet the threshold value, the malware detection application may request permission from a person associated with the computing device.

In some cases, a third-party server associated with the malware detection application (e.g., the server 120) may generate a message indicating the identified malicious application and a selectable option to perform a security action. The third-party server may transmit the message to the computing device 105-a, the computing device 105-b, or the computing device 105-c, or any combination thereof. Alternatively, the computing device 105-a may generate the message indicating the identified malicious application and a selectable option to perform the security action. The selectable option to perform the security action may include a selection to approve or disapprove an uninstall of the malicious application (e.g., across all connected/linked devices). Additionally or alternatively, the selectable option may include quarantining the malicious application, blocking the malicious application, force stopping the malicious application in the case the application is running on the device(s). Upon generating the message, the computing device 105-a may provide the message for display on the computing device 105-a. The message may be an e-mail, a short message service (SMS), an enhanced message service (EMS), a multimedia message service (MMS), an instant messaging notification associated with an instant message application running on the computing device 105, a handheld device markup language (HDML) notification, wireless markup language (WML), among others.

The message may be displayed on a user interface (e.g., a home screen or an application window) of the computing device 105. The user interface of the computing device 105 may be configured via an application programming interface (API). The home screen may a number of visual elements such as, a signal strength indicator for wireless communications, a time, and a battery status indicator. A person associated with the computing device 105 may select to approve or disapprove the uninstall by providing an input. In some cases, the person may be capable to select an option that may disregard the option to uninstall the identified malicious application and add the application as a trusted application. For example, an input may include a single tap or multiple, simultaneous touches of a user interface displaying the message or gestures. Gestures may generally include a touch of the user interface (e.g., a touch-point), optionally accompanied by a corresponding movement of a finger, stylus or other element touching the user interface. In some examples, the message may be displayed in a modal dialog window that may force the person to interact with the message before allowing the person to return to using other features (e.g., applications, messaging, calling) of the computing device 105. In some examples, the message may display the list of the installed applications on all connected devices 105 with on a user interface of the computing device 105.

The malware detection application may generate a report that may include information (e.g., application identifier, metadata, source information, publisher) associated with the identified malicious application (e.g., the application 110-a). The report may be shared with other computing devices or with the application distribution platform 145. For example, the computing device 105-a may transmit the report to the server 120 via communication links 155 and/or the computing device 105-b or the computing device 105-c.

The computing device 105-a may also transmit, to computing the device 105-b or the computing device 105-c, or both, the message for display indicating the identified malicious application and the selectable option to perform the security action via communication links 155. In some examples, at least one of the computing devices 105 may be located remote from the other computing devices. For example, the computing device 105-a may be located at a first location (e.g., a home), the computing device 105-b may be located at a second location different from the first location (e.g., a place of work) and the computing device 105-c may be located at regionally different location (e.g. a different country) from both the computing device 105-a and the computing device 105-c. As a result, the identified malicious application may be removed from all infected computing devices regardless of the location of each device.

In some cases, to enable a single operation (i.e., removal of a malicious application from all related computing devices 105), the computing device 105-a may provide a setting (e.g., via a system setting, or a setting on a malware detection application, etc.) that may enable removal of malicious applications from all connected computing devices 105. The setting may include instructions to perform at least one of notifying each computing device 105 associated with the common account of the identified malicious application or collectively instructing each computing device 105 associated with the common account to automatically quarantine, uninstall, block, or force stop the identified malicious application.

A connected device may be any device that may be linked (e.g., associated, related) to the common account, a person, or a group of persons. In some cases, a setting applied at the computing device 105-a may be propagated (i.e., applied) across all connected computing devices (e.g., the computing device 105-b and the computing device 105-c). As such, when a malicious application is detected on any one of the computing devices 105, a notification may be displayed on all the computing devices 105 where the application is installed or is not installed. Additionally, if a person performs removal of a malicious application on any one of the computing devices 105, then the same malicious application may be removed from the remaining computing devices 105. In some cases, each computing device 105 may generate and provide a notification for display at the computing device 105, once the removal of the malicious application is performed.

The techniques described herein beneficially provide improvements to blocking malware on multiple computing devices to protect data and the devices against malicious programs. Furthermore, the techniques described herein provide improvements to the operation of the device (e.g., computing devices 105). For example, by mitigating potential risks of malicious entities embedding malware onto a computing device, the operating characteristics such as CPU usage and memory usage of the device may be conserved. In addition, the techniques described herein may improve security of applications, data, services, subscriptions executing on the computing device. The techniques described herein may also provide efficiency to the computing device by reducing potential latency associated with CPU processes due to malware.

Figure 2:
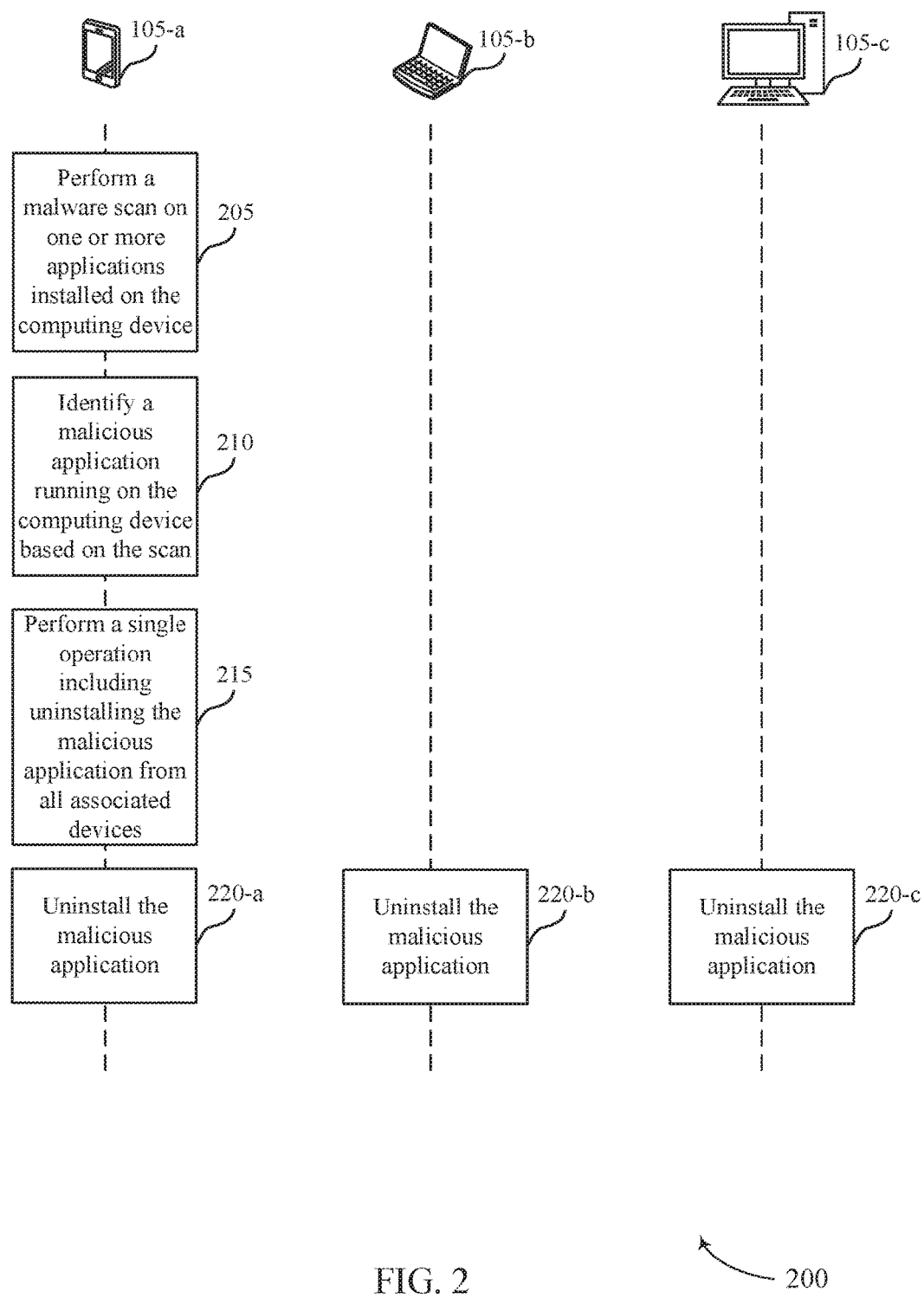
FIG. 2 illustrate a process flow that supports using a common account to block malware on multiple computing devices to protect data and the devices against malicious programs, in accordance with aspects of the present disclosure.

FIG. 2 illustrate a process flow 200 that supports using a common account to block malware on multiple computing devices to protect data and the devices against malicious programs, in accordance with aspects of the present disclosure. In some examples, process flow 200 may implement aspects of the environment 100. The computing device 105-a, the computing device 105-b, and computing device 105-c may be examples of corresponding devices described with reference to FIG. 1. In some configurations, the process flow 200 may be implemented by the malware detection manager 140 as described in FIG. 1. In some configurations, the process flow 200 may be implemented in conjunction with the applications 110 described with reference to FIG. 1.

In the following description of the process flow 200, the operations between the computing device 105-*a*, the computing device 105-*b*, and the computing device 105-*c* may be transmitted in a different order than the exemplary order shown, or the operations performed by the computing device 105-*a*, the computing device 105-*b*, and the computing device 105-*c* may be performed in different orders or at different times. Certain operations may also be left out of the process flow 200, or other operations may be added to the process flow 200.

At block 205, the computing device 105-*a* may perform a malware scan on one or more applications installed on the computing device 105-*a*. At block 210, the computing device 105-*a* may identify a malicious application running on the computing device 105-*a* based on the scan.

At block 215, the computing device 105-*a* may perform a single operation including uninstalling the malicious application from all associated devices. In some cases, the computing device 105-*a* may determine that the malicious application is installed on at least a second computing device or a third computing device, or both. For example, the computing device 105-*a* may determine that the malicious application is installed on the computing device 105-*b* and/or the computing device 105-*c*. In further cases, the computing device 105-*a* may notify all associated devices without determining whether the malicious application is installed on one or more associated devices. For example, a malicious application may be installed on the computing device 105-*a* but may not be installed on the computing device 105-*b* and/or the computing device 105-*c*. In this example, the computing device 105-*a* may transmit a notification to the computing device 105-*b* and/or the computing device 105-*c* notifying these devices of the detected malicious application on the computing device 105-*a*. Upon receiving the notification, the computing device 105-*b* and/or the computing device 105-*c* may ignore the notification in the case that these device do not have the detected malicious application installed.

At block 220-*a* through 220-*c*, the computing devices 105-*a* through 105-*c* may uninstall the malicious application. The uninstall may be synchronously performed among the computing devices 105. In some cases, the malicious application on the computing devices 105-*a* through 105-*c* may be quarantined. Quarantining may include isolating the malicious application from each computing device 105. Isolating the malicious application may mitigate the malicious application from performing additional damage to hardware of the computing devices 105. The computing devices 105-*a* through 105-*c* may generate a summary report based on uninstalling the malicious application.

Figure 3:
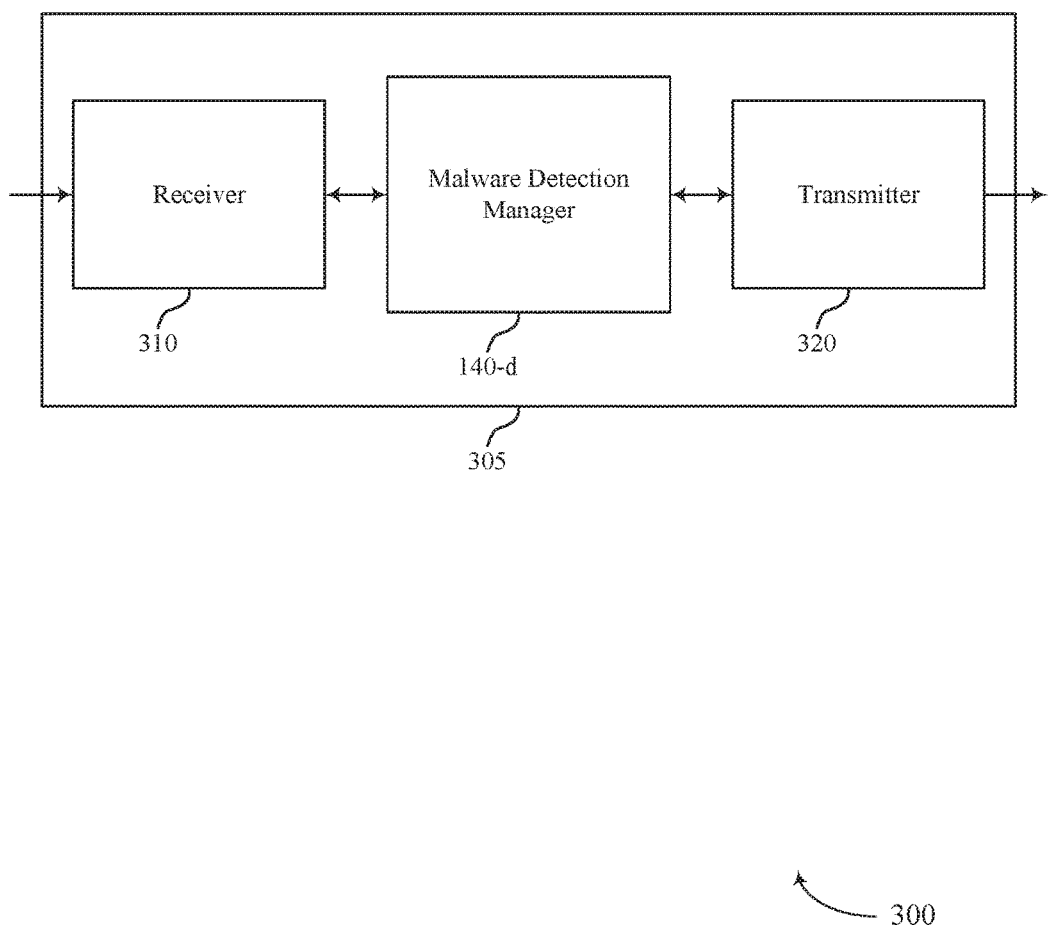
FIGS. 3-5 illustrate block diagrams of a computing device that supports using a common account to block malware on multiple computing devices to protect data and the devices against malicious programs, in accordance with aspects of the present disclosure.

FIG. 3 illustrates a block diagram 300 of a computing device 305 that supports using a common account to block malware on multiple computing devices to protect data and the devices against malicious programs, in accordance with aspects of the present disclosure. Computing device 305 may be an example of aspects of computing device 105 or server 120 as described with reference to FIG. 1. Computing device 305 may include one or more processors. Each of the components of computing device 305 may be in communication with one another (e.g., via one or more buses).

Receiver 310 may receive request in the form of electronic messages. The electronic messages may include metadata. Receiver 310 may communicate with one or more computing devices 105 or servers 120 over a network 110 as described with reference to FIG. 1. A received electronic message and components of the electronic message may be passed on to other components of computing device 305. In some cases, receiver 310 may be an example of aspects of transceiver 625 described with reference to FIG. 6. Receiver 310 may utilize a single antenna or a set of antennas.

Malware detection manager 140-*d* and/or at least some of its various sub-components may be implemented in hardware, software executed by a processor, firmware, or any combination thereof. If implemented in software executed by a processor, the functions of the malware detection manager 140-*d* and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

Malware detection manager 140-*d* and/or at least some of its various sub-components may be physically located at various positions, including being distributed such that portions of functions are implemented at different physical locations by one or more physical devices. In some examples, malware detection manager 140-*d* and/or at least some of its various sub-components may be a separate and distinct component in accordance with various aspects of the present disclosure. In other examples, malware detection manager 140-*d* and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Malware detection manager 140-*d* may identify a malicious application running on computing device 305, determine that the malicious application is installed on a second computing device based at least in part on the identifying, and perform a single operation including uninstalling the malicious application from computing device 305 and the second computing device.

Transmitter 320 may transmit signals generated by other components of computing device 305. In some examples, transmitter 320 may be collocated with receiver 310 in a transceiver module. For example, transmitter 320 may be an example of aspects of transceiver 625 described with reference to FIG. 6. Transmitter 320 may utilize a single antenna or a set of antennas.

Figure 4:
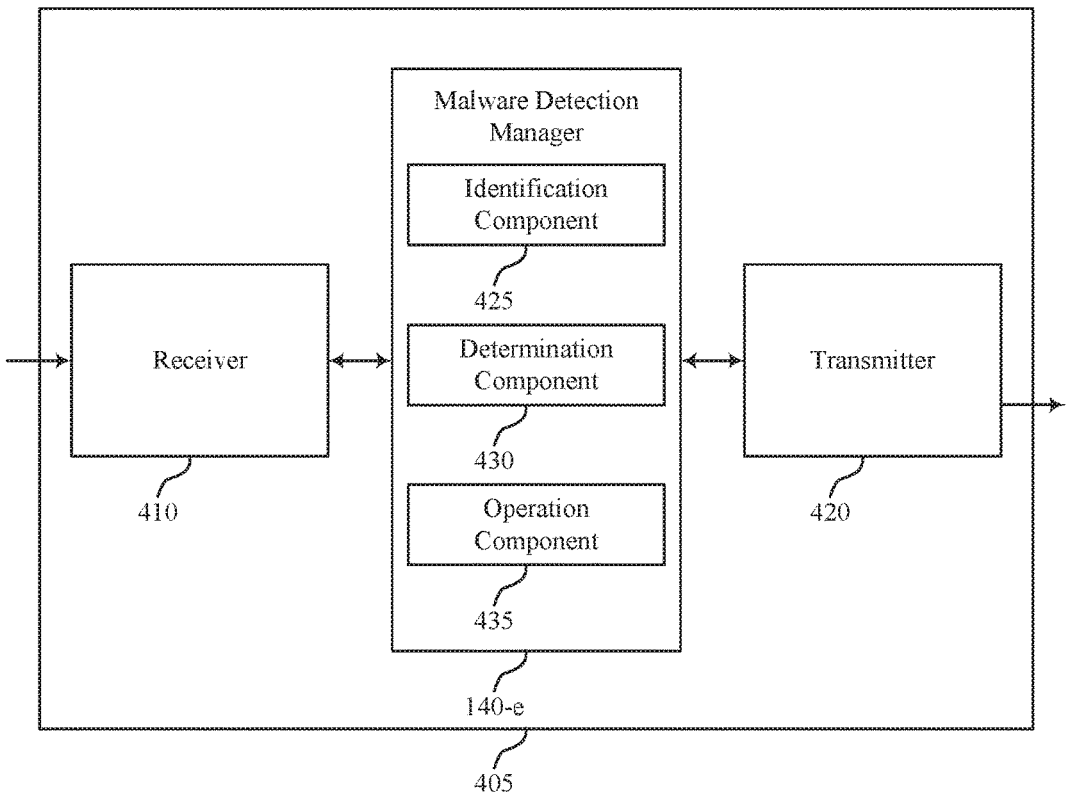

FIG. 4 illustrates a block diagram 400 of a computing device 405 that supports using a common account to block malware on multiple computing devices to protect data and the devices against malicious programs, in accordance with aspects of the present disclosure. Computing device 405 may be an example of aspects of computing device 105 or server 120 as described with reference to FIG. 1. The computing device 405 may include one or more processors. Each of the components of computing device 405 may be in communication with one another (e.g., via one or more buses).

Receiver 410 may receive request in the form of electronic messages (e.g., emails, short message services (SMS) mobile messages, web requests, application request). Receiver 410 may communicate with one or more computing devices 105 or servers 120 over network 110 as described with reference to FIG. 1. A received electronic message and components of the electronic message may be passed on to other components of computing device 405. In some examples, receiver 410 may be an example of aspects of transceiver 625 described with reference to FIG. 6. Receiver 310 may utilize a single antenna or a set of antennas.

Malware detection manager 140-e may be an example of aspects of the malware detection manager 140 described with reference to FIGS. 1, 3, 5, 6, and 9. Malware detection manager 140-e may also include an identification component 425, a determination component 430, and an operation component 435. Identification component 425 may identify a malicious application running on computing device 405. Determination component 430 may determine that the malicious application is installed on a second computing device based at least in part on the identifying. Operation component 435 may perform a single operation including uninstalling the malicious application from computing device 405 and the second computing device.

Transmitter 420 may transmit signals generated by other components of computing device 405. In some examples, transmitter 420 may be collocated with receiver 410 in a transceiver module. For example, transmitter 420 may be an example of aspects of transceiver 625 described with reference to FIG. 6. Transmitter 420 may utilize a single antenna or a set of antennas.

Figure 5:
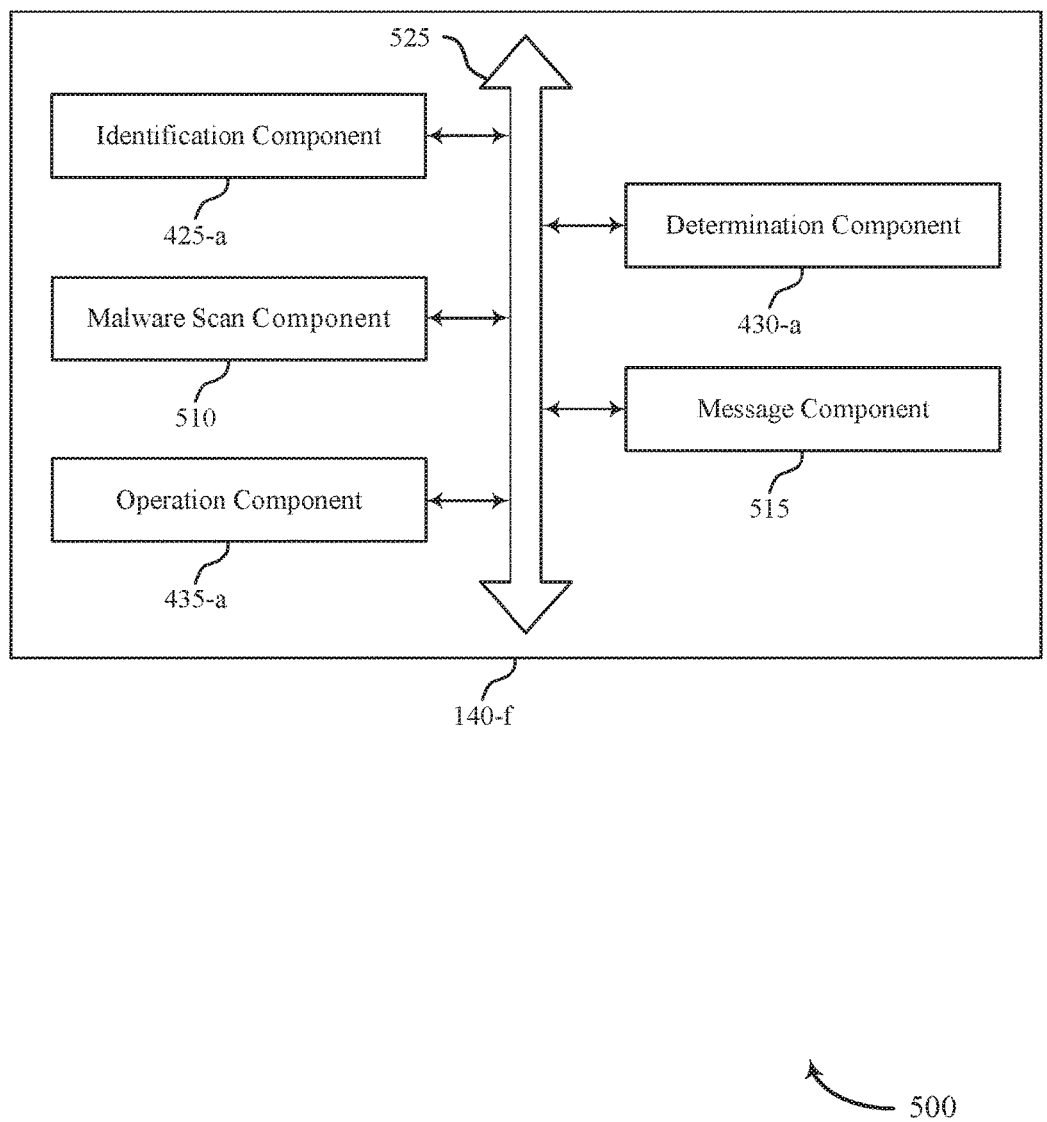

FIG. 5 illustrates a block diagram 500 of a malware detection manager 140-f that supports using a common account to block malware on multiple computing devices to protect data and the devices against malicious programs, in accordance with aspects of the present disclosure. The malware detection manager 140-f may be an example of aspects of a malware detection manager described with reference to FIG. 1, 3-6, 9, or 10. Malware detection manager 140-f may include an identification component 425-a, a determination component 430-a, a malware scan component 510, a message component 515, and an operation component 435-a. Each of these components may communicate, directly or indirectly, with one another (e.g., via bus 525).

Identification component 425-a may identify a malicious application running on a first computing device. In some cases, identifying the malicious application running on the first computing device is based at least in part on a malware scan. Determination component 430-a may determine that the malicious application is installed on a second computing device based at least in part on the identifying. In some cases, the first computing device and the second computing device share a common account associated with a malware detection application or an application distribution platform. Determination component 430-a may identify the second computing device based at least in part on the common account. In some examples, determining that the malicious application is installed on the second computing device is based at least in part on the common account. Malware scan component 510 may perform a malware scan on one or more applications installed on the first computing device.

Message component 515 may generate a message indicating the identified malicious application and a selectable option to perform a security action. In some examples, the selectable option to perform the security action may include a selection to approve or disapprove an uninstall. Message component 515 may provide the message for display on the first computing device. In some cases, message component 515 may receive a response message based at least in part on the message.

Message component 515 may transmit, to the second computing device, the message indicating the identified malicious application and the selectable option to perform the security action based at least in part on the first computing device and the second computing device sharing a common account associated with a malware detection application or an enterprise application store. In some examples, the common account includes an application setting and an association to a database. The application setting may include instructions to perform at least one of notifying each computing device associated with the common account of the identified malicious application or collectively instructing each computing device associated with the common account to automatically uninstall the identified malicious application, or both. The database may include one or more entries comprising a unique identifier associated with each computing device, an association of each unique identifier to the common account or a trusted third-party account, and a list of applications installed on each computing device, or any combination thereof.

Operation component 435-a may perform a single operation including uninstalling the malicious application from the first computing device and the second computing device. In some cases, operation component 435-a may enable the single operation, based at least in part on a setting of the first computing device and the second computing device, to collectively uninstall the identified malicious application from both the first computing device and the second computing device.

Operation component 435-a may perform the security action based at least in part on the response message. In some examples, uninstalling the malicious application from the first computing device is based at least in part on performing the security action. In some examples, uninstalling the malicious application from the second computing device is based at least in part on the message.

Figure 6:
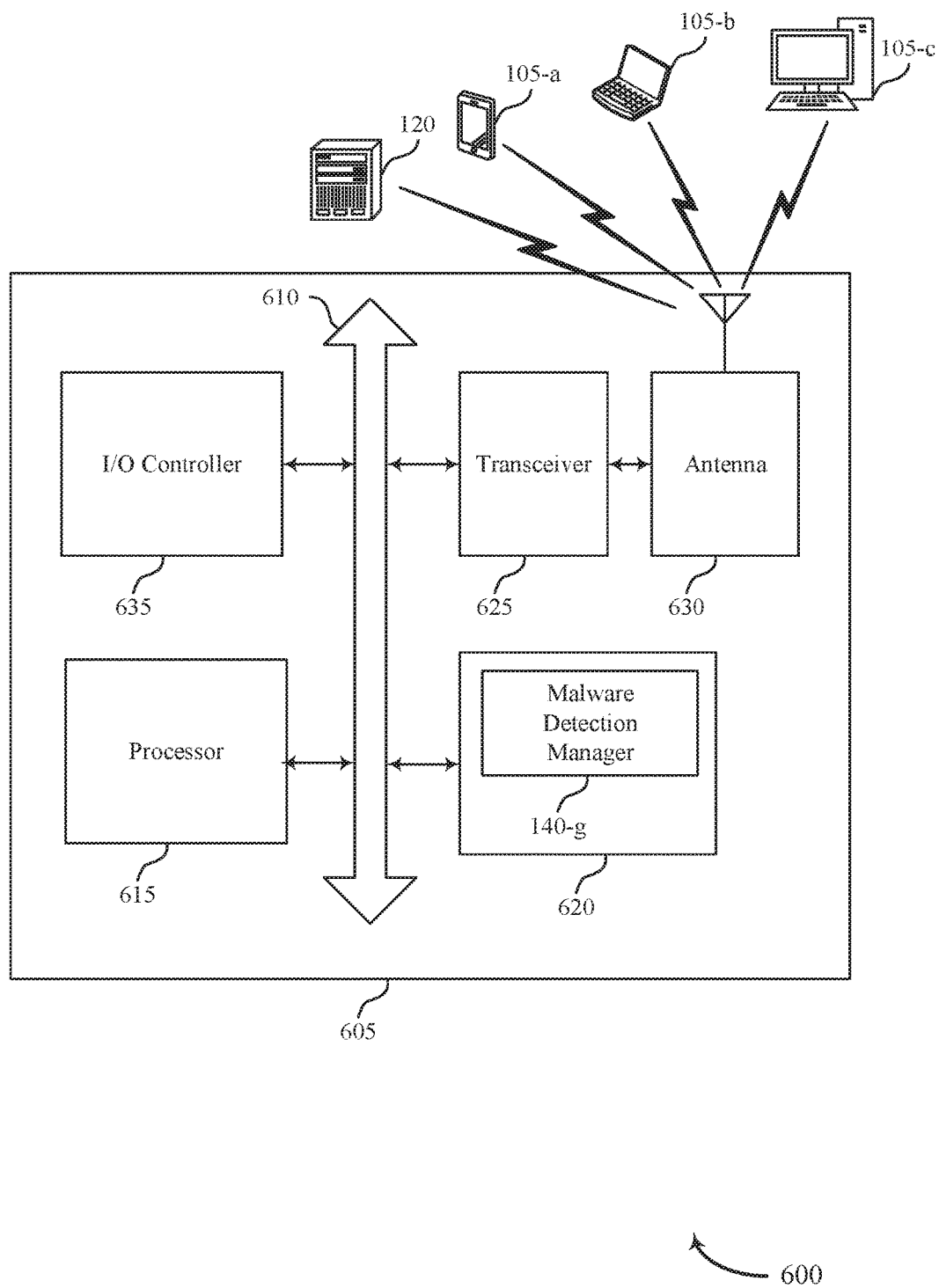
FIG. 6 illustrates block diagram of a system including a computing device that supports using a common account to block malware on multiple computing devices to protect data and the devices against malicious programs, in accordance with aspects of the present disclosure.

FIG. 6 illustrates a block diagram of a system 600 including a computing device 605 that supports using a common account to block malware on multiple computing devices to protect data and the devices against malicious programs, in accordance with aspects of the present disclosure. Computing device 605 may be an example of computing device 105 or server 120 and its components as described herein. System 600 may also include server 120, computing device 105-a, computing device 105-b, and computing device 105-c, which may be an example of server 120 or computing devices 105 as described with reference to FIG. 1.

Computing device 605 may include a bus 610 which interconnects major subsystems of computing device 605, such as one or more processors 615, a system memory 620 such as read-only memory (ROM) or flash memory, and random access memory (RAM), flash RAM, or the like, an I/O controller 635, a transceiver 625, and an antenna 630.

Processor 615 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 615 may be configured to operate a memory array using a memory controller. In other cases, a memory controller may be integrated into processor 615. Processor 615 may be configured to execute computer-readable instructions stored in a memory to perform various functions (e.g., functions or tasks to protect against malicious programs).

Bus 610 may allow data communication between processor 615 and system memory 620, which may include ROM or flash memory, and RAM, as previously noted. The RAM is generally the main memory into which the operating system and application programs are loaded. The ROM or flash memory can contain, among other code, the Basic Input-Output system (BIOS) or a Unified Extensible Firmware Interface (UEFI), which controls basic hardware operation such as the interaction with peripheral components or devices. For example, malware detection manager 140-g, to implement the present techniques, may be stored within system memory 620.

System memory 620 may store computer-readable, computer-executable software including instructions that, when executed, cause the processor to perform various functions described herein. In some cases, system memory 620 may contain, among other things, a BIOS which may control basic hardware or software operation such as the interaction with peripheral components or devices.

Malware detection manager 140-g may be an example of malware detection manager depicted and described in FIG. 1, 3-6, 9, or 10. Malware detection manager 140-g may identify a malicious application running on computing device 605, determine that the malicious application is installed on a second computing device (e.g., computing device 105-a, computing device 105-b, or computing device 105-c, or any combination thereof) based at least in part on the identifying, and perform a single operation including uninstalling the malicious application from computing device 305 and the second computing device. Applications resident within computing device 605 may be stored on and accessed via a non-transitory computer readable medium, such as a hard disk drive, an optical drive, or other storage medium. Additionally, applications can be in the form of electronic signals modulated in accordance with the application and data communication technology when accessed via a network.

Transceiver 625 may communicate bi-directionally, via one or more antennas, wired, or wireless links as described above. For example, transceiver 625 may represent a wireless transceiver and may communicate bi-directionally with another wireless transceiver. In some cases, computing device 605 may include a single antenna 630. However, in some cases computing device 605 may have more than one antenna 630, which may be capable of concurrently transmitting or receiving multiple wireless transmissions.

Figure 7:
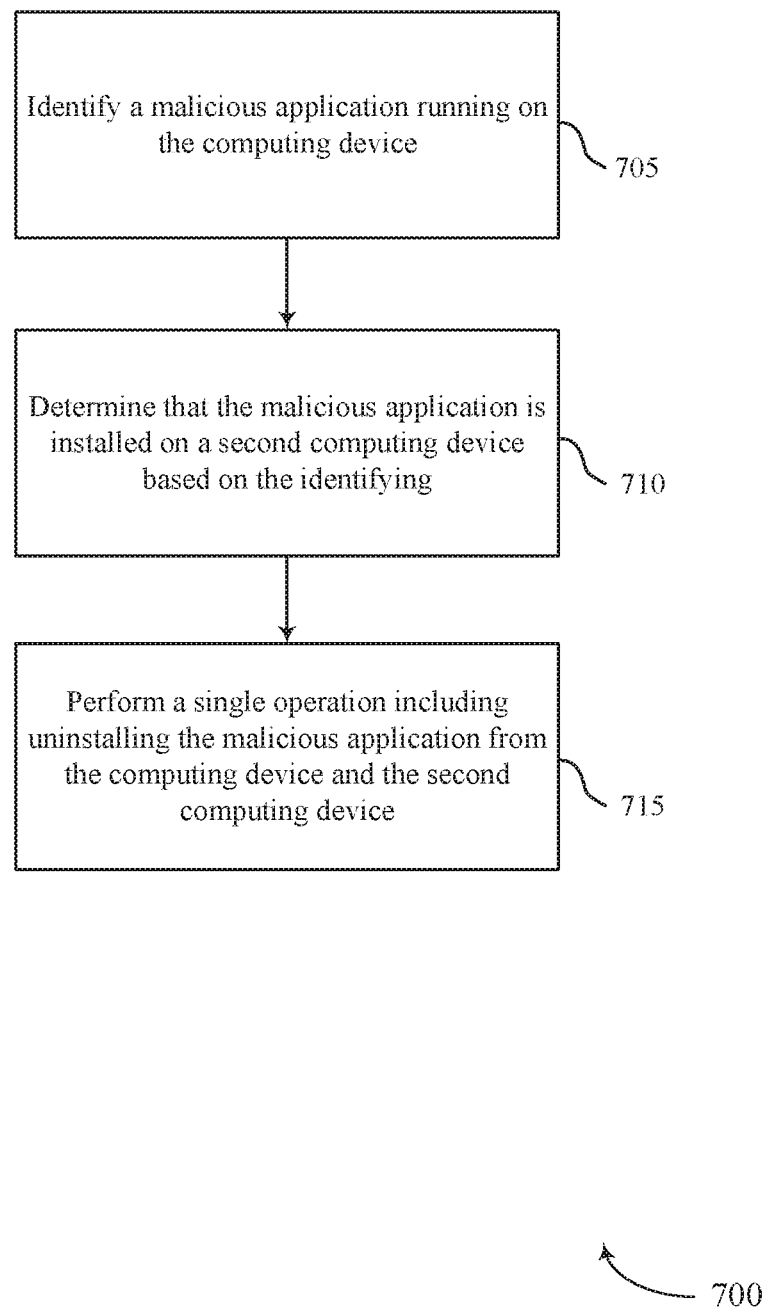
FIG. 7 illustrates a method for using a common account to block malware on multiple computing devices to protect data and the devices against malicious programs, in accordance with aspects of the present disclosure.

FIG. 7 shows a flowchart illustrating a method 700 for using a common account to block malware on multiple computing devices to protect data and the devices against malicious programs, in accordance with aspects of the present disclosure. The operations of the method 700 may be implemented by the computing device 105 or its component described herein. For example, the operations of the method 700 may be performed by a malware detection manager as described with reference to FIGS. 1, 3-6, 9, and 10. In some cases, alternatively, the operations of the method 700 may be implemented by the server 120 or its components described herein.

In some examples, the computing device 105 or the server 120, or both may execute a set of codes to control the functional elements of the computing device 105 or the server 120 to perform the functions described below. Additionally or alternatively, the computing device 105 or the server 120, or both may perform aspects of the functions described below using special-purpose hardware. In some configurations, the method 700 may be implemented in conjunction with the application 110 as described with reference to FIG. 1. In the following description of the method 700, the operations may be performed in a different order than the exemplary order shown. Certain operations may also be left out of the method 700, or other operations may be added to the method 700.

At block 705, the computing device 105 may identify a malicious application running on the computing device 105. The operations of block 705 may be performed according to the methods described herein. In certain examples, aspects of the operations of block 705 may be performed by an identification component as described with reference to FIGS. 4 and 5.

At block 710, the computing device 105 may determine that the malicious application is installed on a second computing device based on the identifying. The operations of block 710 may be performed according to the methods described herein. In certain examples, aspects of the operations of block 710 may be performed by a determination component and a validation component as described with reference to FIGS. 4 and 5.

At block 715, the computing device 105 may perform a single operation including uninstalling the malicious application from the computing device 105 and the second computing device. The operations of block 715 may be performed according to the methods described herein. In certain examples, aspects of the operations of block 715 may be performed by an operation component as described with reference to FIGS. 4 and 5. Techniques for better detecting and removing malware across multiple computing devices concurrently, may be provided by the method 700.

Benefits of the method 700 may include eliminating disadvantages of conventional techniques for removing malicious applications from multiple devices, by enabling a mechanism to remove the malicious applications from all the devices in a single operation (e.g., simultaneously, concurrently, synchronously remove the malicious application from all infected devices).

Figure 8A:
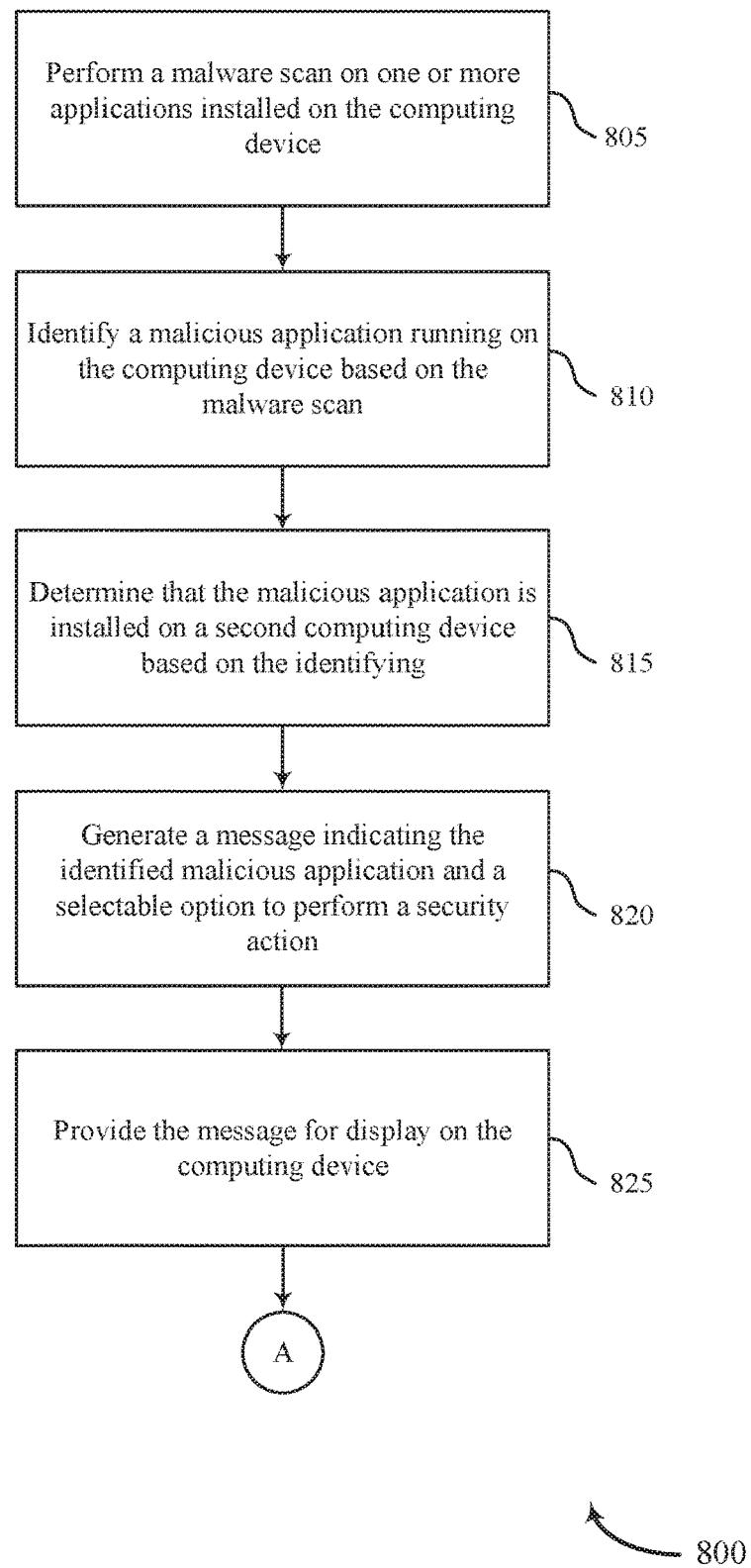
FIGS. 8A and 8B illustrate a method for using a common account to block malware on multiple computing devices to protect data and the devices against malicious programs, in accordance with aspects of the present disclosure.
Figure 8B:
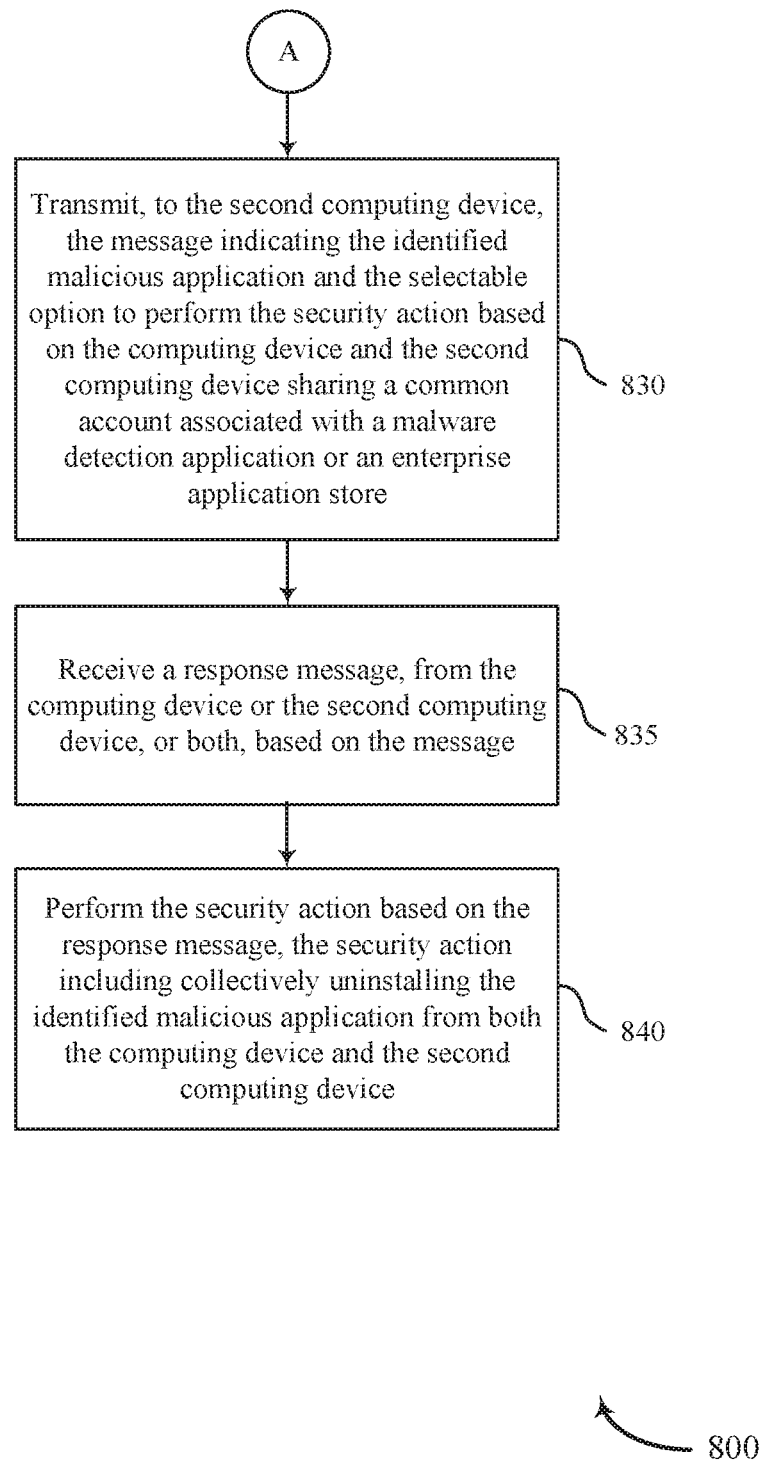

FIGS. 8A and 8B illustrate a method 800 for using a common account to block malware on multiple computing devices to protect data and the devices against malicious programs, in accordance with aspects of the present disclosure. The operations of the method 800 may be implemented by the computing device 105 (e.g., the computing device 105-a, the computing device 105-b, or the computing device 105-c, or any combination thereof) or its components described herein. For example, the operations of the method 800 may be performed by a malware detection manager as described with reference to FIGS. 1, 3-6, 9, and 10. In some cases, the operations of the method 800 may be implemented by the server 120 or its components described herein. In some examples, the computing device 105 or the server 120 may execute a set of codes to control the functional elements of the computing device 105 or the server 120 to perform the functions described below.

Additionally or alternatively, the computing device 105 or the server 120, or both may perform aspects of the functions described below using special-purpose hardware. In some cases, the method 800 may be implemented in conjunction with the application 110 as described with reference to FIG. 1. In the following description of the method 800, the operations may be performed in a different order than the exemplary order shown. Certain operations may also be left out of the method 800, or other operations may be added to the method 800.

At block 805, the computing device 105 may perform a malware scan on one or more applications installed on the computing device 105. For example, a person may using the computing device 105 install one or more software applications from an application distribution platform hosted by a server, as described with reference to FIG. 1. The person may browse and download software applications from the platform. In some examples, applications offered by the application distribution platform may be registered based on a category, and the person may select a category to discover and download an application on the computing device 105. For example, an application category may include entertainment, finance, health and fitness, social networking, music, news, shopping, among others. In some examples, the person may have one or more additional computing devices 105 that the person may download and install the same or different applications on. The operations of block 805 may be performed according to the methods described herein. In certain examples, aspects of the operations of block 805 may be performed by a malware scan component as described with reference to FIG. 5.

At block 810, the computing device 105 may identify a malicious application running on the computing device 105 based on the malware scan. The malware scan may be associated with a malware detection application that may be installed (e.g., preinstalled) on the computing device 105. The operations of block 810 may be performed according to the methods described herein. In certain examples, aspects of the operations of block 810 may be performed by an identification component as described with reference to FIGS. 4 and 5.

At block 815, the computing device 105 may determine that the malicious application is installed on a second computing device based on the identifying. For example, the computing device 105-*a* may determine that the malicious application identified, based on the malware scan, is also installed on the computing device 105-*b* or the computing device 105-*c*, or both. A malware detection application may be installed on the computing device 105-*a*, the computing device 105-*b*, and the computing device 105-*c*. In some cases, the determination may be based on a common account associated with the malware detection application or the application distribution platform shared between the computing device 105-*a*, the computing device 105-*b*, or the computing device 105-*c*, or any combination thereof.

During the installation (e.g., downloading, registering) of the malware detection application, the malware detection application may request each computing device to provide identification information (e.g., MAC address, TID or TIN, a UDI, among others. The malware detection application may store the identification information in a database (e.g., database 130). In some examples, the malware detection application may be hosted by a third-party server, and each computing device may upload the identification information during install to the third-party server. As such, upon identifying a malicious application running on computing device, the malware detection application running on the computing device 105 may transmit a message to the third-party server (e.g., associated with the malware detection application). The server may identify additional computing devices linked to the same account as the computing device 105 and determine that the additional computing devices also have the malicious application installed. Alternatively, the computing device 105 may analyze account information (e.g., a list of computing devices registered to a same account associated with the malware detection application or an application distribution platform) to determine that the additional computing devices also have the malicious application installed. The operations of block 815 may be performed according to the methods described herein. In certain examples, aspects of the operations of block 815 may be performed by a determination component as described with reference to FIGS. 4 and 5.

At block 820, the computing device 105 may generate a message indicating the identified malicious application and a selectable option to perform a security action. In some examples, the selectable option to perform the security action may include a selection to approve or disapprove an uninstall, a quarantine, or a closing (e.g., end processes) of the identified malicious application. The operations of block 820 may be performed according to the methods described herein. In certain examples, aspects of the operations of block 820 may be performed by a message component as described with reference to FIG. 5.

At block 825, the computing device 105 may provide the message for display on computing device 105. The message may be a SMS, an EMS, a MMS, an instant messaging notification associated with an instant message application running on the computing device 105, a HDML notification, among others. The operations of block 825 may be performed according to the methods described herein. In certain examples, aspects of the operations of block 825 may be performed by a message component as described with reference to FIG. 5.

At block 830, the computing device 105 may transmit, to the second computing device the message indicating the identified malicious application and the selectable option to perform the security action based on the computing device 105 and the second computing device sharing a common account associated with a malware detection application or an enterprise application store (e.g., application distribution platform). Similarly, the message may be an e-mail, a SMS, an EMS, a MMS, etc. The operations of block 830 may be performed according to the methods described herein. In certain examples, aspects of the operations of block 830 may be performed by a message component as described with reference to FIG. 5.

At block 835, the computing device 105 may receive a response message, from the computing device 105 or the second computing device, or both, based on the message. For example, the computing device 105 may receive an input (e.g., a selection to approve or disapprove an uninstall, a quarantine, a closing of an application, ending a process, etc.) of the identified malicious application) from a person via a user interface of the computing device 105. In addition, computing device 105 may receive a response message indicating a selection to approve or disapprove an uninstall, a quarantine, or a closing (e.g., end processes) of the identified malicious application) from a person via a user interface of the second computing device. In some examples, the computing device 105 and the second computing device may be associated with a same or different person. Additionally, the computing device 105 and the second computing device may be located at different locations. For example, the computing device 105 may be a device located at person's office while the second computing device may be a table located at the person's home. The operations of block 835 may be performed according to the methods described herein. In certain examples, aspects of the operations of block 835 may be performed by a message component as described with reference to FIG. 5.

At block 840, the computing device 105 may perform the security action based on the response message (received from the computing device 105 and/or the second computing device), the security action including collectively uninstalling the identified malicious application from both the computing device 105 and the second computing device. In some examples, the computing device 105 may perform the security action base on at least receiving a response message from at least one computing device (e.g., the computing device 105 or the second computing device). The operations of block 840 may be performed according to the methods described herein. In certain examples, aspects of the operations of block 840 may be performed by a message component as described with reference to FIG. 5.

Benefits of the method 800 may include by enabling a mechanism to remove a malicious applications from all infected devices in a single operation (e.g., simultaneously, concurrently, synchronously remove the malicious application from all connected devices).

It should be noted that the methods described above describe possible implementations, and that the operations and the steps may be rearranged or otherwise modified and that other implementations are possible. Further, aspects from two or more of the methods may be combined.

Figure 9:
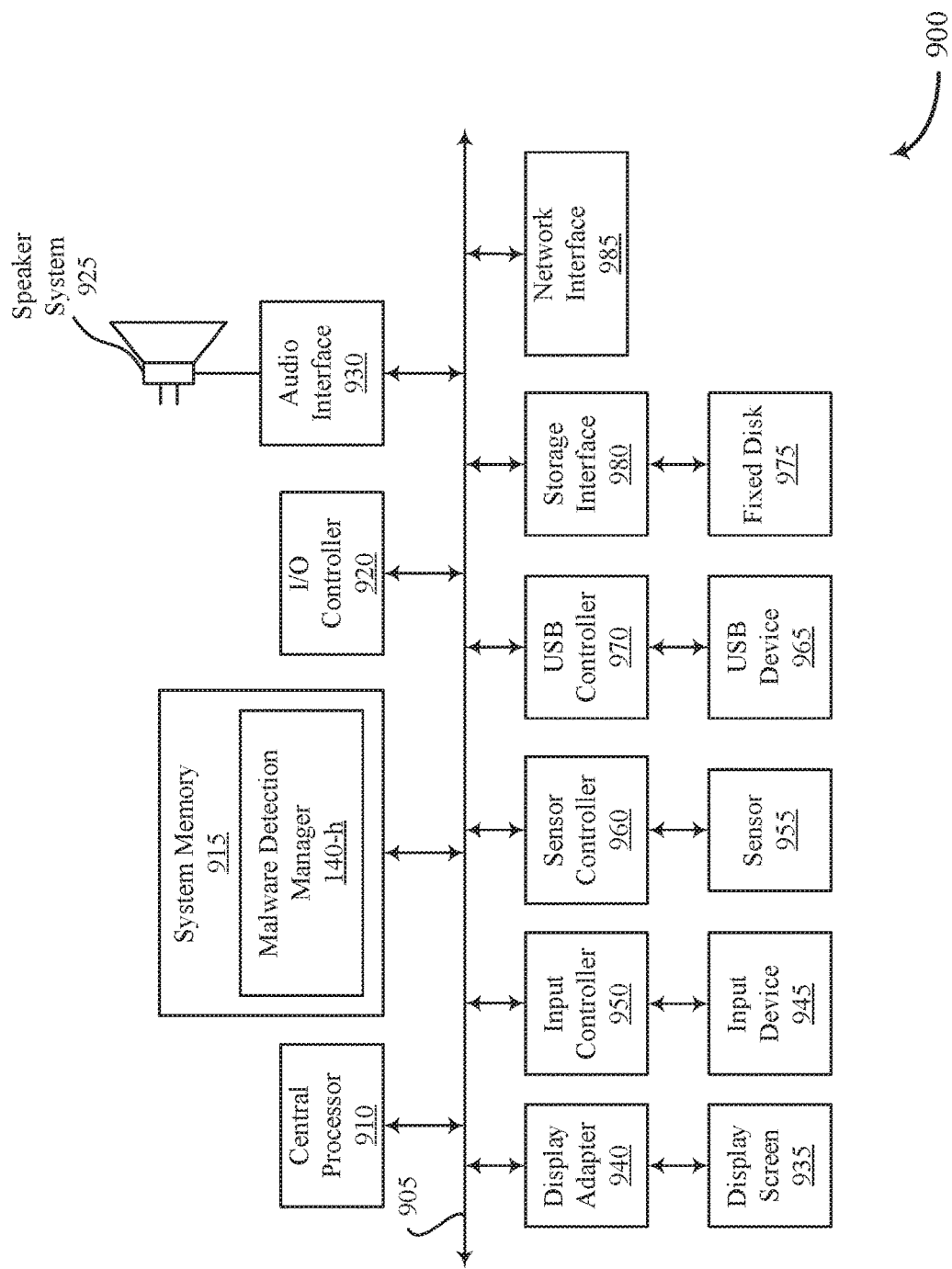
FIG. 9 illustrates a block diagram of a computing system that supports using a common account to block malware on multiple computing devices to protect data and the devices against malicious programs, in accordance with aspects of the present disclosure.

FIG. 9 illustrates a block diagram of a computing system 900 that supports using a common account to block malware on multiple computing devices to protect data and the devices against malicious programs, in accordance with aspects of the present disclosure. For example, all or a portion of the computing system 900 may perform and be a means for performing, either alone or in combination with other elements, one or more of the operations described herein (such as one or more of the operations as described in FIGS. 1 through 8). All or a portion of the computing system 900 may also perform or be a means for performing any other operations, methods, or processes described and illustrated herein.

The computing system 900 may be any single or multi-processor computing device or system capable of executing computer-readable instructions. The computing system 900 may be an example of the computing device 105 or the server 120 as described with reference to FIG. 1. For example, the computing system 900 may include, but is not limited to, workstations, laptops, client-side terminals, servers, distributed computing systems, handheld devices, or any other computing system or device.

In some cases, the computing system 900 may include at least one central processor 910 and a system memory 915. The central processor 910 may include any type or form of physical processing unit (e.g., a hardware-implemented central processing unit) capable of processing data or interpreting and executing instructions. In some cases, the central processor 910 may receive instructions from a computer software application. These instructions may cause the central processor 910 to perform the functions of one or more of the exemplary cases described and illustrated herein. The system memory 915 may include any type or form of volatile or non-volatile storage device or medium capable of storing data and other computer-readable instructions. Examples of the system memory 915 include Random Access Memory (RAM), Read Only Memory (ROM), flash memory, or any other suitable memory device. In one example, a malware detection manager 140-*h* may be loaded into the system memory 915.

In some cases, the computing system 900 may include a bus 905 which interconnects major subsystems of the computing system 900, such as the central processor 910, the system memory 915, an input/output controller 920, an external audio device, such as a speaker system 925 via an audio output interface 930, an external device, such as a display screen 935 via display adapter 940, an input device 945 (e.g., remote control device interfaced with an input controller 950), multiple USB devices 965 (interfaced with a universal serial bus (USB) controller 970), and a storage interface 980. Also included are at least one sensor 955 connected to the bus 905 through a sensor controller 960 and a network interface 985 (coupled directly to bus 905).

The bus 905 allows data communication between the central processor 910 and the system memory 915, which may include ROM or flash memory, and RAM, as previously noted. The RAM is generally the main memory into which the operating system and application programs are loaded. The ROM or flash memory can contain, among other code, BIOS or UEFI, which controls basic hardware operation such as the interaction with peripheral components or devices. Applications (e.g., the applications 110) resident with the computing system 900 are generally stored on and accessed via a non-transitory computer readable medium, such as a hard disk drive (e.g., a fixed disk 975) or other storage medium. Additionally, applications can be in the form of electronic signals modulated in accordance with the application and data communication technology when accessed via the interface 985.

The storage interface 980, as with the other storage interfaces of the computing system 900, can connect to a standard computer readable medium for storage and/or retrieval of information, such as the fixed disk drive 975. The fixed disk drive 975 may be a part of the computing system 900 or may be separate and accessed through other interface systems. The network interface 985 may provide a direct connection to a remote server via a direct network link to the Internet via a POP (point of presence). The network interface 985 may provide such connection using wireless techniques, including digital cellular telephone connection, Cellular Digital Packet Data (CDPD) connection, digital satellite data connection, or the like.

Many other devices or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 9 need not be present to practice the present techniques. The devices and subsystems can be interconnected in different ways from that shown in FIG. 9. The aspect of some operations of a system such as that shown in FIG. 9 are readily known in the art and are not discussed in detail in this application. Code to implement the present disclosure can be stored in a non-transitory computer-readable medium such as one or more of the system memory 915 or the fixed disk 975. The operating system provided on the computing system 900 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other cases of the present techniques may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with the computing system 900 may include wireless communication signals such as radio frequency, electromagnetics, local area network (LAN), wide area network (WAN), metropolitan area network (MAN), virtual private network (VPN), wireless network (using 802.11, for example), cellular network (using 3G, Long Term Evolution (LTE), Next Generation 5G new radio (NR) for example), and/or other signals. The network interface 985 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 920 may operate in conjunction with the network interface 1085 or the storage interface 980, or both. The network interface 985 may enable the computing system 900 with the ability to communicate with client devices (e.g., device 105 of FIG. 1), or other devices over the network 110 of FIG. 1, or both. The network interface 985 may provide wired or wireless network connections, or both. In some cases, the network interface 985 may include an Ethernet adapter or Fiber Channel adapter. The storage interface 980 may enable the computing system 900 to access one or more data storage devices. The one or more data storage devices may include two or more data tiers each. The storage interface 980 may include one or more of an Ethernet adapter, a Fiber Channel adapter, Fiber Channel Protocol (FCP) adapter, a SCSI adapter, and iSCSI protocol adapter.

Figure 10:
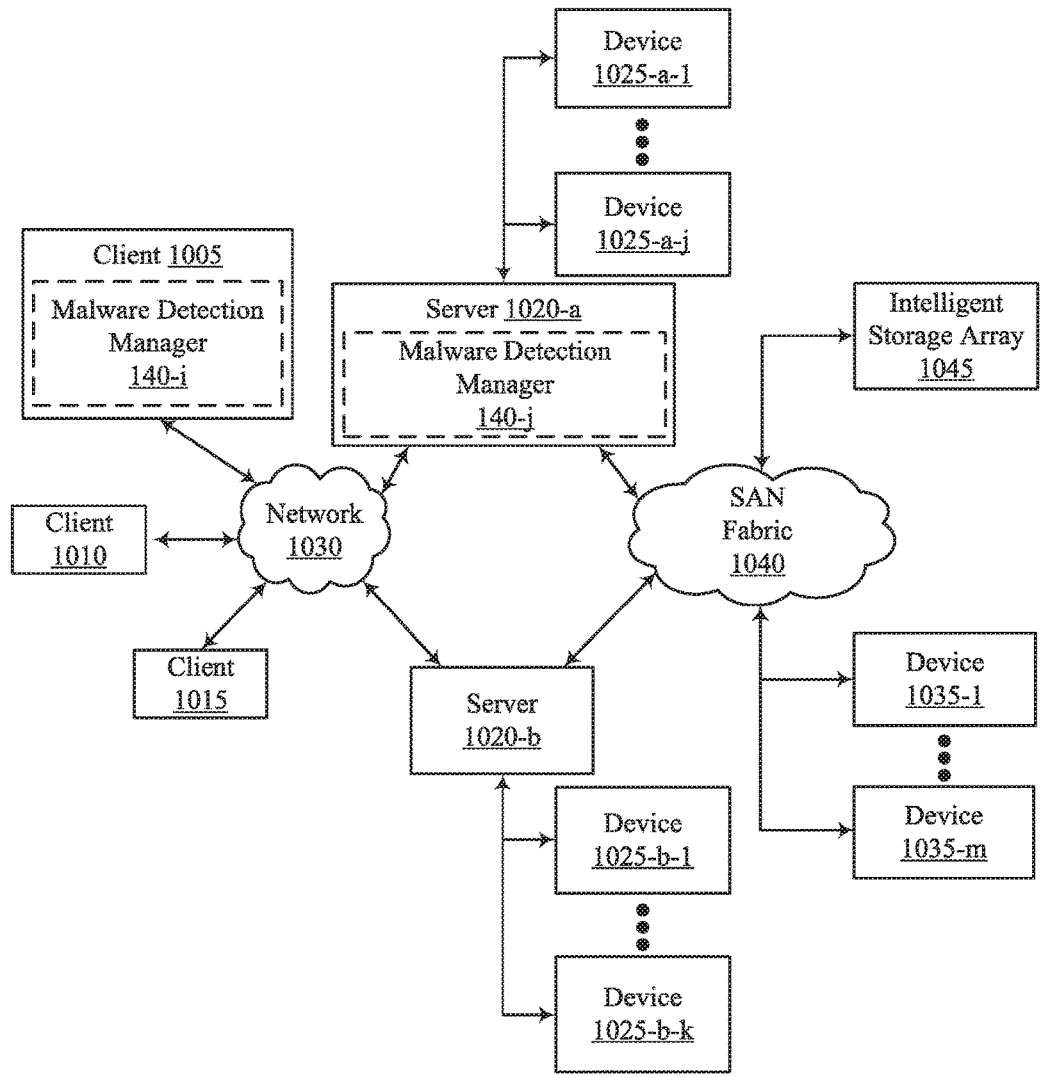
FIG. 10 illustrates a block diagram of an exemplary network architecture in which client systems and servers may be coupled to a network to support using a common account to block malware on multiple computing devices to protect data and the devices against malicious programs, in accordance with one or more aspects of the present disclosure.

FIG. 10 illustrates a block diagram of an exemplary network architecture 1000 in which client systems 1005, 1010, and 1015 and servers 1020-*a* and 1020-*b* may be coupled to a network 1030 to support using a common account to block malware on multiple computing devices to protect data and the devices against malicious programs, in accordance with one or more aspects of the present disclosure. As provided above, all or a portion of the network architecture 1000 may perform or be a means for performing, either alone or in combination with other elements, one or more of the operations disclosed herein (such as one or more of the operations illustrated in FIG. 2, 7, or 8). All or a portion of network architecture 1000 may also be used to perform or be a means for performing other operations and features set forth in the present disclosure.

The client systems 1005, 1010, and 1015 may represent any type or form of computing device or system, such as exemplary in the computing system 900 in FIG. 9. Similarly, the servers 1020-*a* and 1020-*b* may represent computing devices or systems, such as application servers or database servers, configured to provide various database services and run software applications. The network 1030 may represent any telecommunication or computer network including, for example, an intranet, a WAN, a LAN, a Personal Area Network (PAN), a cellular network (e.g., LTE, LTE-Advanced (LTE-A), Next Generation 5G NR network, or the Internet. In some cases, the client systems 1005, 1010, and 1015 and the server 1020-*a* or 1020-*b* may include all or a portion of the environment 100 from FIG. 1.

The malware detection manager 140-*i* may be located within one of the client system 1005, 1010, or 1015, or any combination thereof to implement the present techniques. The malware detection manager 140-*i* may be one example of the malware detection manager 140 depicted and described in FIG. 1, 3-6, or 9. The malware detection manager 140-*i* may identify a malicious application running on a client system (e.g., the client system 1005) and determine that the malicious application is installed on a second client system (e.g., the client system 1010) based at least in part on the identifying. In some cases, the malware detection manager 140-*i* may perform a single operation including uninstalling the malicious application from the first client system (e.g., the client system 1005) and the second client system (e.g., the client system 1010). Alternatively, the malware detection manager 140-*j* may optionally be located within one of the server 1020-*a* or the server 1020-*b* to implement the present techniques. The malware detection manager 140-*j* may be one example of the malware detection manager 140 depicted and described in FIG. 1, 3-6, or 9.

The server 1020-*a* is further depicted as having storage devices 1025-*a*-1 through 1025-*a*-*j* directly attached, and server 1020-*b* is depicted with storage devices 1025-*b*-1 through 1025-*b*-*k* directly attached. SAN fabric 1040 supports access to storage devices 1035-1 through 1035-*m* by servers 1020-*a* and 1020-*b*, and so by the client systems 1005, 1010, and 1015 via the network 1030. Intelligent storage array 1045 is also shown as an example of a specific storage device accessible via SAN fabric 1040. With reference to the computing system 900, the network interface 985 or some other means or method can be used to provide connectivity from each of the client systems 1005, 1010, and 1015 to the network 1030.

With reference to the computing system 600, the transceiver 625 or some other means or method can be used to provide connectivity from each of the client systems 1005, 1010, and 1015 to the network 1030. The client systems 1005, 1010, and 1015 are able to access information on the server 1020-*a* or the server 1020-*b* using, for example, a web browser or other client software. Such a client allows the client systems 1005, 1010, and 1015 to access data hosted by the server 1020-*a* or 1020-*b* or one of the storage devices 1025-*a*-1 through 1025-*a*-*j*, 1025-*b*-1 through 1025-*b*-*k*, 1035-1 through 1035-*m*, or the intelligent storage array 1045. FIG. 10 depicts the use of a network such as the Internet for exchanging data, but the present techniques are not limited to the Internet or any particular network-based environment.

In some cases, all or a portion of one or more of the exemplary cases disclosed herein may be encoded as a computer program and loaded onto and executed by the server 1020-*a* or server 1020-*b*, or the storage devices 1025-*a*-1 through 1025-*a*-*j*, the storage devices 1035-1 through 1035-*m*, the intelligent storage array 1045, or any combination thereof. All or a portion of one or more of the exemplary cases disclosed herein may also be encoded as a computer program, run by the server 1020-*a* or the stored in server 1020-*b*, and distributed to the client systems 1005, 1010, and 1015 over the network 1030. As detailed above, the computing system 900 and/or one or more components of the network architecture 1000 may perform and/or be a means for performing, either alone or in combination with other elements, one or more operations of an exemplary method for preventing malware on computing devices.

While the foregoing disclosure sets forth various cases using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various cases have been described and/or illustrated herein in the context of fully functional computing systems, one or more of these exemplary cases may be distributed as a program product in a variety of forms, regardless of the particular type of computer-readable media used to actually carry out the distribution. The cases disclosed herein may also be implemented using software components that perform certain tasks. These software components may include script, batch, or other executable files that may be stored on a computer-readable storage medium or in a computing system. In some cases, these software components may configure a computing system to perform one or more of the exemplary cases disclosed herein.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The foregoing description, for purpose of explanation, has been described with reference to specific cases. However, the illustrative discussions above are not intended to be exhaustive or to limit the invention to the precise forms disclosed. Many modifications and variations are possible in view of the above teachings. The cases were chosen and described in order to best explain the principles of the present techniques and their practical applications, to thereby enable others skilled in the art to best utilize the present techniques and various cases with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining a packet injection. For example, types of security actions may include preventing the packet from performing any actions on the computing device, alerting an administrator to the potential maliciousness of the connection, quarantine a file related to the connection, delete the file, block a download of the file, and/or warn a user about the connection. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A method for preventing malware, the method being performed by one or more computing devices comprising at least one processor, the method comprising:

identifying, by a first computing device, a malicious application running on the first computing device;

determining, by the first computing device, that the identified malicious application is installed on a second computing device based at least in part on the identifying;

generating a message indicating the identified malicious application and a selectable option to perform a security action comprising at least one of quarantining, blocking, or force stopping the identified malicious application;

transmitting, to the second computing device, the message indicating the Identified malicious application and the selectable option to perform the security action based at least in part on the first computing device and the second computing device sharing a common account associated with a malware detection application or an enterprise application store; and performing, by the first computing device, a single operation comprising uninstalling the identified malicious application from the first computing device and the second computing device based at least in part on a global setting to enable removal of malicious applications from all connected devices, wherein uninstalling the identified malicious application from the second computing device is based at least in part on the message.

2. The method of claim 1, further comprising:
enabling the single operation, based at least in part on a setting of the first computing device and the second computing device, to collectively uninstall the identified malicious application from both the first computing device and the second computing device.

3. The method of claim 1, further comprising:
providing the message for display on the first computing device;
receiving a response message based at least in part on the message; and
performing the security action based at least in part on the response message,
wherein uninstalling the identified malicious application from the first computing device is based at least in part on performing the security action.

4. The method of claim 3, wherein the selectable option to perform the security action comprises a selection to approve or disapprove the uninstall.

5. The method of claim 1, further comprising:
performing a malware scan on one or more applications installed on the first computing device, wherein identifying the malicious application running on the first computing device is based at least in part on the malware scan.

6. The method of claim 1, wherein the first computing device and the second computing device share the common account associated with the malware detection application or an application distribution platform.

7. The method of claim 6, further comprising:
identifying the second computing device based at least in part on the common account, wherein determining that the identified malicious application is installed on the second computing device is based at least in part on the common account.

8. The method of claim 6, wherein the common account comprises an application setting and an association to a database.

9. The method of claim 8, wherein the application setting comprises instructions to perform at least one of notifying each computing device associated with the common account of the identified malicious application or collectively instructing each computing device associated with the common account to automatically uninstall the identified malicious application, or both.

10. The method of claim 8, wherein the database comprises one or more entries comprising a unique identifier associated with each computing device, an association of each unique identifier to the common account or a trusted third-party account, and a list of applications installed on each computing device, or any combination thereof.

11. A computing device configured for preventing malware, further comprising:
one or more processors;
memory in electronic communication with the one or more processors, wherein the memory stores computer executable instructions that when executed by the one or more processors cause the one or more processors to:
identify, by the computing device, a malicious application running on the computing device;
determine, by the computing device, that the identified malicious application is installed on a second computing device based at least in part on the identifying;
generate a message indicating the identified malicious application and a selectable option to perform a security action comprising at least one of quarantining, blocking, or force stopping the identified malicious application;
transmit, to the second computing device, the message indicating the identified malicious application and the selectable option to perform the security action based at least in part on the computing device and the second computing device sharing a common account associated with a malware detection application or an enterprise application store; and
perform, by the computing device, a single operation comprising uninstalling the identified malicious application from the computing device and the second computing device based at least in part on a global setting to enable removal of malicious applications from all connected devices, wherein uninstalling the identified malicious application from the second computing device is based at least in part on the message.

12. The computing device of claim 11, wherein the instructions are further executable by the one or more processors to:
enable the single operation, based at least in part on a setting of the computing device and the second computing device, to collectively uninstall the identified malicious application from both the computing device and the second computing device.

13. The computing device of claim 11, wherein the instructions are further executable by the one or more processors to:
provide the message for display on the computing device;
receive a response message based at least in part on the message; and
perform the security action based at least in part on the response message,
wherein uninstalling the identified malicious application from the computing device is based at least in part on performing the security action.

14. The computing device of claim 13, wherein the selectable option to perform the security action comprises a selection to approve or disapprove the uninstall.

15. The computing device of claim 11, wherein the instructions are further executable by the one or more processors to:

perform a malware scan on one or more applications installed on the computing device, wherein identifying the malicious application running on the computing device is based at least in part on the malware scan.

16. The computing device of claim 11, wherein the computing device and the second computing device share the common account associated with the malware detection application or an application distribution platform.

17. A non-transitory computer-readable medium storing computer executable instructions that when executed by the one or more processors cause the one or more processors to:
  identify, by the one or more processors of a first computing device, a malicious application running on the first computing device;
  determine, by the one or more processors of the first computing device, that the identified malicious application is installed on a second computing device based at least in part on the identifying;
  generate a message Indicating the Identified malicious application and a selectable option to perform a security action comprising at least one of quarantining, blocking, or force stopping the identified malicious application;
  transmit, to the second computing device, the message indicating the identified malicious application and the selectable option to perform the security action based at least in part on the first computing device and the second computing device sharing a common account associated with a malware detection application or an enterprise application store; and
  perform, by the one or more processors of the first computing device, a single operation comprising uninstalling the identified malicious application from the first computing device and the second computing device based at least in part on a global setting to enable removal of malicious applications from all connected devices, wherein uninstalling the identified malicious application from the second computing device is based at least In art on the message.

18. The non-transitory computer-readable medium of claim 17, wherein the instructions are further executable by the one or more processors to:
  enable the single operation, based at least in part on a setting of the first computing device and the second computing device, to collectively uninstall the identified malicious application from both the first computing device and the second computing device.

* * * * *